US009165509B2

(12) United States Patent
Saitoh et al.

(10) Patent No.: US 9,165,509 B2
(45) Date of Patent: Oct. 20, 2015

(54) DISPLAY MODULE, DISPLAY DEVICE COMPRISING SAME, AND ELECTRONIC DEVICE

(75) Inventors: Kohji Saitoh, Osaka (JP); Asahi Yamato, Osaka (JP); Masami Ozaki, Osaka (JP); Toshihiro Yanagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 80 days.

(21) Appl. No.: 14/113,432

(22) PCT Filed: Apr. 23, 2012

(86) PCT No.: PCT/JP2012/060891
§ 371 (c)(1),
(2), (4) Date: Oct. 23, 2013

(87) PCT Pub. No.: WO2012/147703
PCT Pub. Date: Nov. 1, 2012

(65) Prior Publication Data
US 2014/0049533 A1 Feb. 20, 2014

(30) Foreign Application Priority Data

Apr. 28, 2011 (JP) .................. 2011-102379

(51) Int. Cl.
*G09G 3/34* (2006.01)
*G09G 3/20* (2006.01)
*G06F 1/26* (2006.01)

(52) U.S. Cl.
CPC .. *G09G 3/34* (2013.01); *G06F 1/26* (2013.01); *G09G 3/20* (2013.01); *G09G 2310/0272* (2013.01); *G09G 2310/08* (2013.01); *G09G 2370/08* (2013.01)

(58) Field of Classification Search
CPC ......... G09G 3/20; G09G 3/34; G09G 3/3685; G09G 2310/027; G09G 2310/0294; G09G 2310/0297
USPC .......................................... 345/211–213, 204
See application file for complete search history.

(56) References Cited

U.S. PATENT DOCUMENTS 5,726,677 A    3/1998  Imamura
5,877,738 A    3/1999  Ito et al.
(Continued)

FOREIGN PATENT DOCUMENTS

JP    06-095617 A    4/1994
JP    06-130910 A    5/1994
(Continued)

OTHER PUBLICATIONS

Official Communication issued in International Patent Application No. PCT/JP2012/060891, mailed on Jul. 24, 2012.

*Primary Examiner* — Premal Patel
(74) *Attorney, Agent, or Firm* — Keating & Bennett, LLP

(57) ABSTRACT

A display module includes a plurality of source drivers; a plurality of memory sections respectively provided for the plurality of source drivers, each of the plurality of memory sections being for storage of at least data of a video signal to be displayed on that one of a plurality of divided regions for which that one of the plurality of source drivers is provided, for which the memory section is provided; and a timing controller serving as a sync controller configured to synchronize the plurality of source drivers to synchronously output video signals that the plurality of source drivers output based on data respectively supplied from the plurality of memory sections, so that the synchronized video signals are supplied to corresponding ones of the plurality of divided regions.

12 Claims, 17 Drawing Sheets

(56) References Cited

U.S. PATENT DOCUMENTS

| | | |
|---|---|---|
| 5,900,856 A | 5/1999 | Iino et al. |
| 6,084,563 A | 7/2000 | Ito et al. |
| 6,456,271 B1* | 9/2002 | Tamai et al. ............... 345/100 |
| 6,937,216 B1 | 8/2005 | Ishiyama |
| 2001/0013850 A1 | 8/2001 | Sakaguchi et al. |
| 2002/0180684 A1* | 12/2002 | Saitou et al. ............... 345/98 |
| 2003/0197706 A1 | 10/2003 | Isozaki |
| 2004/0160408 A1* | 8/2004 | Hwang ..................... 345/102 |
| 2006/0114217 A1* | 6/2006 | Kim et al. ................. 345/100 |
| 2007/0273632 A1* | 11/2007 | Kishimoto et al. .......... 345/98 |

FOREIGN PATENT DOCUMENTS

| | | |
|---|---|---|
| JP | 2001-092424 A | 4/2001 |
| JP | 2001-174843 A | 6/2001 |
| WO | 00/03381 A1 | 1/2000 |

\* cited by examiner

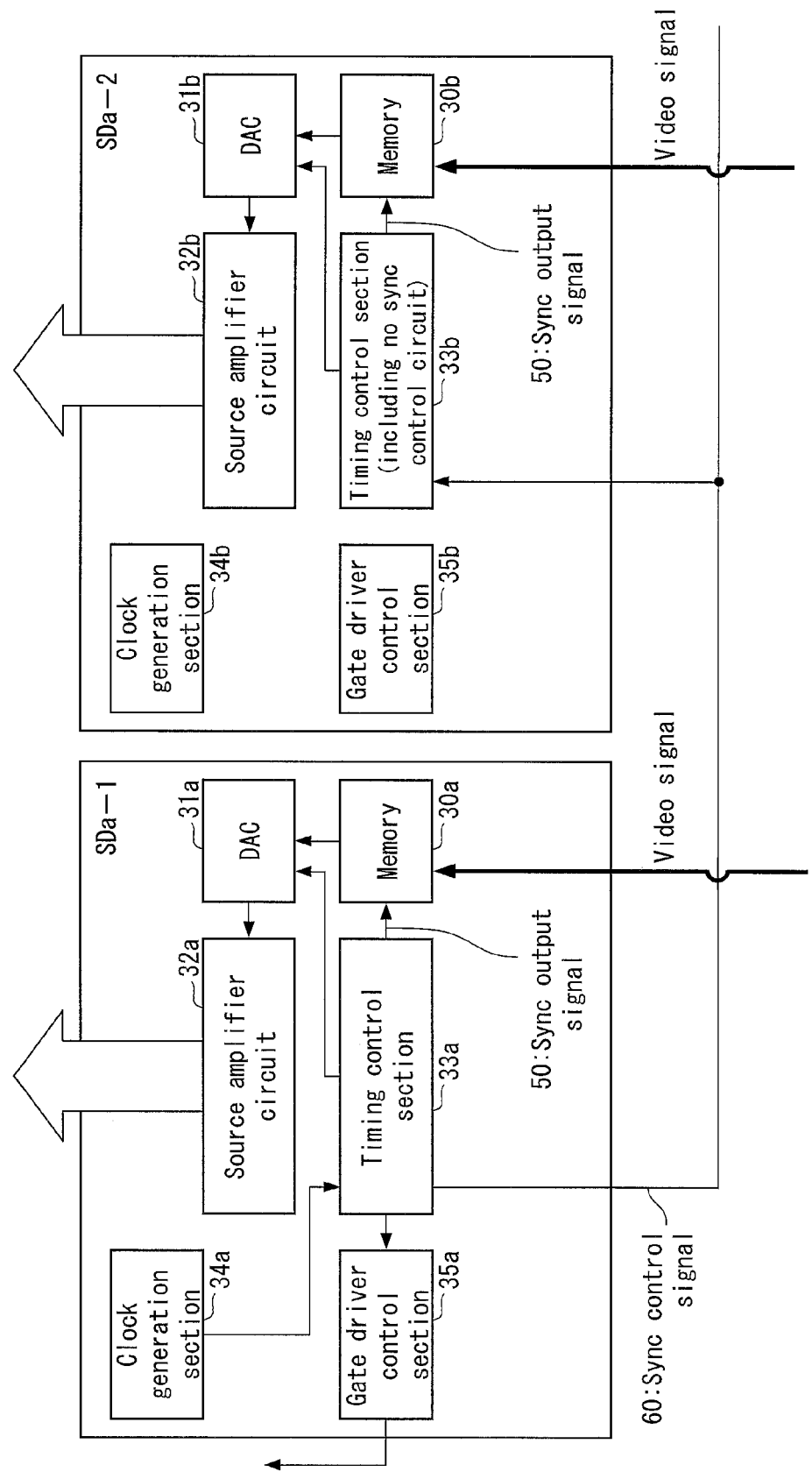
F I G. 2

F I G. 7
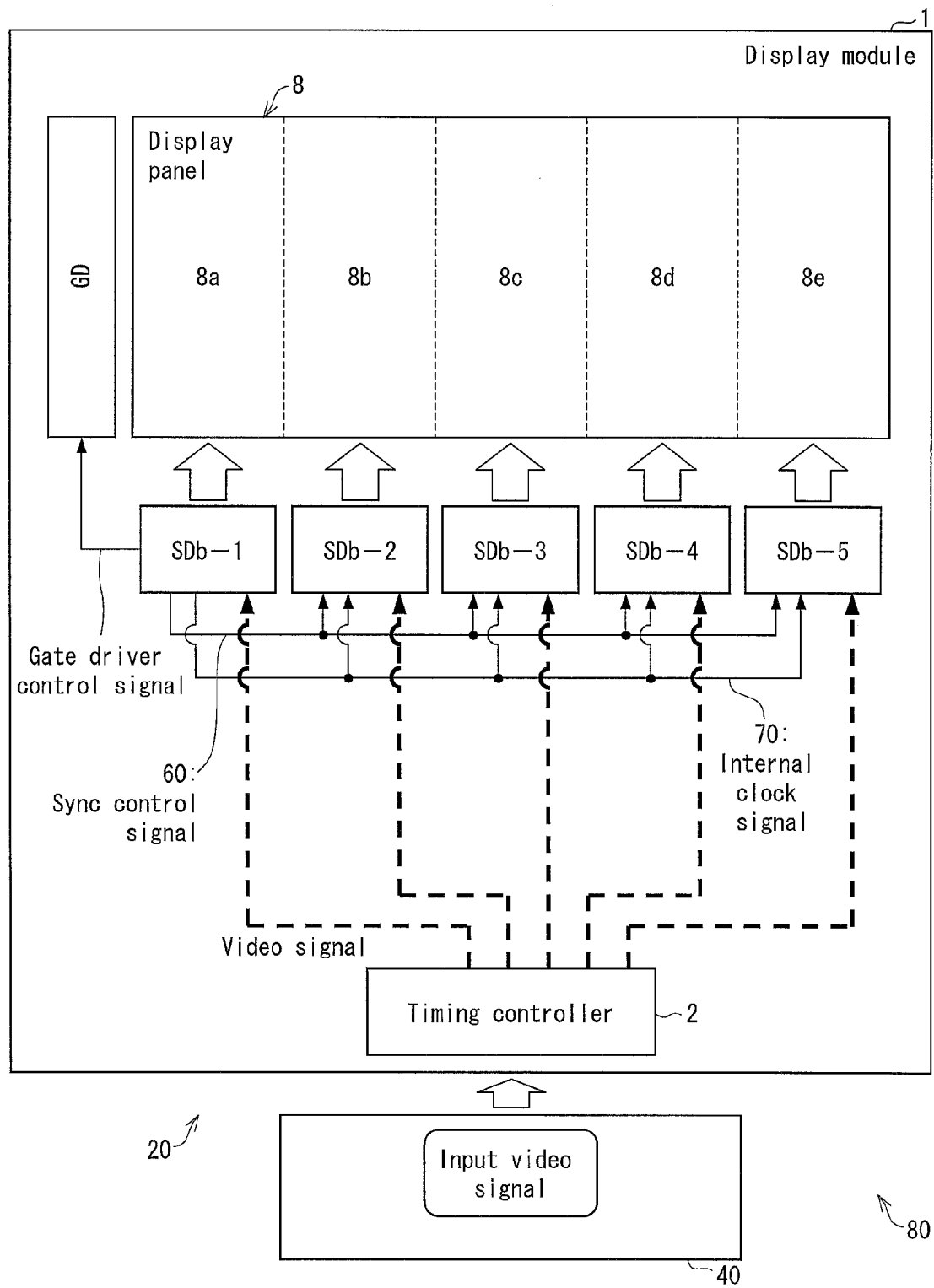

F I G. 8
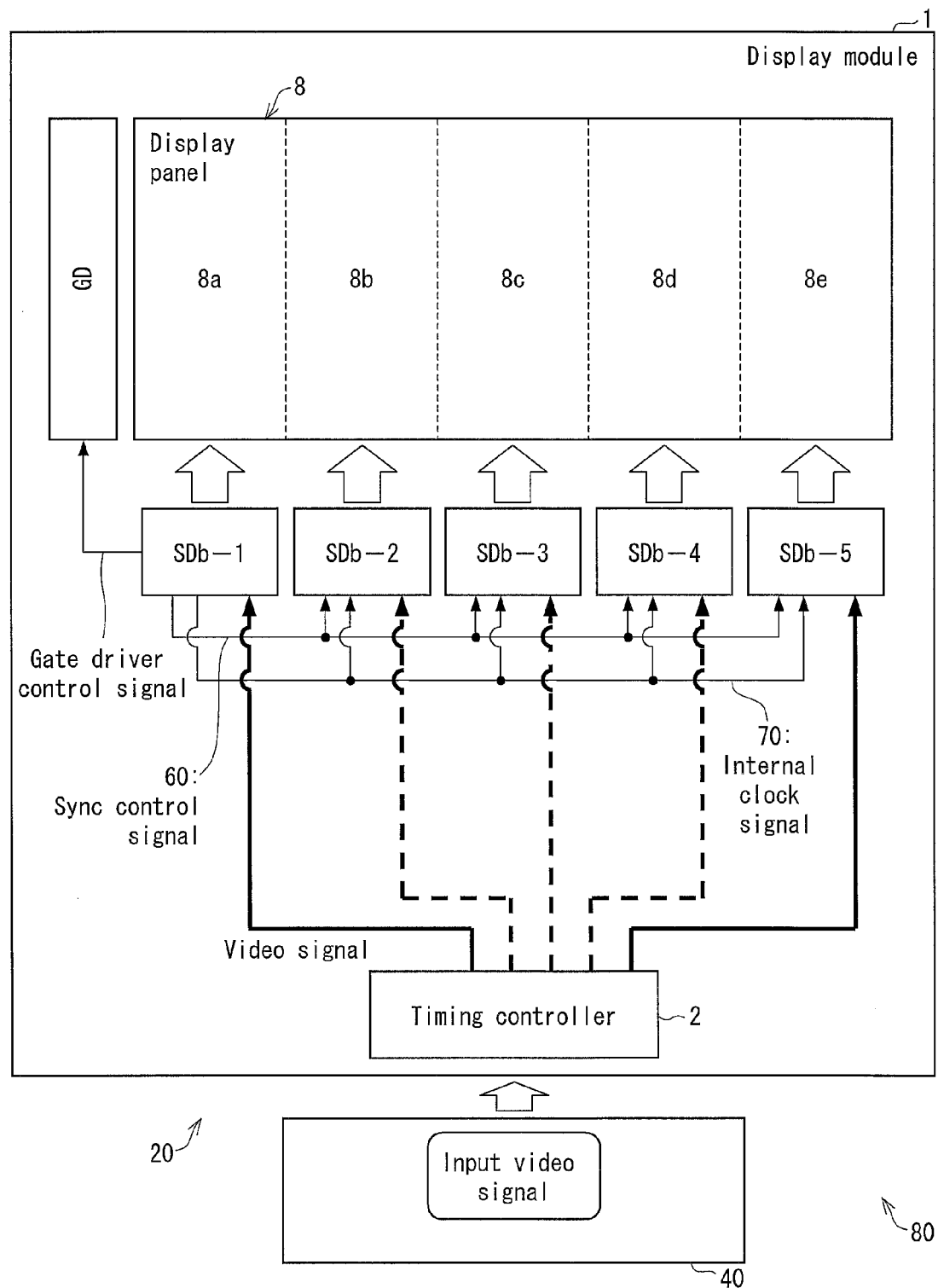

DISPLAY MODULE, DISPLAY DEVICE COMPRISING SAME, AND ELECTRONIC DEVICE

TECHNICAL FIELD

The present invention relates to a display module which includes a plurality of source drivers and which can synchronize outputs of data from memory sections provided respectively to the plurality of source drivers, a display device including the display module, and an electronic device including the display module.

BACKGROUND ART

There is known a display module including: a display panel divided into a plurality of regions; and a plurality of source drivers for the plurality of regions, respectively (Patent Literature 1). The display module also includes a timing controller. The timing controller receives an input video signal from outside, and converts the input video signal into video signals with such timings and/or in such image formats that the respective source drivers can easily transmit the signal to the display region to which the source driver belongs. The converted video signals are supplied to individual source drivers.

A description is provided below as to this configuration with reference to FIG. 17. A display module 101 illustrated in FIG. 17 includes a display panel 108, a gate driver GD, a plurality of source drivers SD, and a timing controller 102.

The display panel 108 (display region) is divided into a plurality of regions, and a plurality of source drivers SD are provided for the regions 108a to 108e, respectively.

The timing controller 102 includes a frame memory 200. Image data included in an input video signal supplied to the timing controller 102 from outside is stored in the frame memory 200.

Furthermore, the timing controller 102 generates a sync control signal etc. The timing controller 102 transmits the video signals and the sync control signal to individual source drivers SD. Thus, the display panel 108 can display an image satisfactory without difference in image quality between the plurality of source drivers.

Furthermore, since the timing controller 102 includes the frame memory 200, it is possible to stop input to the timing controller 102 from outside. However, it is necessary to continue to transfer signals from the timing controller 102 to the source drivers.

CITATION LIST

Patent Literatures

[Patent Literature 1]
  Japanese Patent Application Publication No. 2001-174843 (published on Jun. 29, 2001)

SUMMARY OF INVENTION

Technical Problem

In the above conventional configuration, it is necessary to always supply a video signal from the timing controller to the plurality of source drivers. Consequently, a large amount of power is consumed for supplying video signals from the timing controller to the plurality of source drivers.

Furthermore, recently, in response to a request to design a display device with high resolution, the frame memory is required to have a large capacity. The increase in capacity of the frame memory results in increased processing load of the timing controller including the frame memory and in cost-up of the timing controller.

The present invention was made in view of the foregoing problems. An object of the present invention is to provide a display module capable of controlling synchronization among video signals supplied from individual source drivers while preventing cost-up of the timing controller due to increase in memory capacity, a display device including the display module, and an electronic device including the display module.

Solution to Problem

In order to solve the foregoing problems, a display module of the present invention includes: a plurality of source drivers respectively provided for a plurality of divided regions each being a part of a display region; a plurality of memory sections respectively provided for the plurality of source drivers, each of the plurality of memory sections being for storage of at least data of a video signal to be displayed on that one of the plurality of divided regions for which that one of the plurality of source drivers is provided, for which the memory section is provided; and sync control means for synchronizing the plurality of source drivers to synchronously output video signals that the plurality of source drivers output based on data respectively supplied from the plurality of memory sections of the plurality of source drivers, so that the synchronized video signals are supplied to corresponding ones of the plurality of divided regions.

With the arrangement, each of the plurality of source drivers includes a memory section for storage of at least data of a video signal to be displayed on a divided region adjacent to said each of the plurality of source drivers. This allows keeping down an increase in the memory capacity of a timing controller or makes it unnecessary to increase the memory capacity a timing controller, thereby preventing cost-up of the timing controller which would be caused by the increase.

Furthermore, with the arrangement, in which the display module includes the sync control means, it is possible to synchronize video signals respectively supplied from the plurality of source drivers to the display region. Consequently, even when the display module includes a plurality of source drivers and/or includes no timing controller, the display module allows for satisfactory display without variations in display between the source drivers.

In order to solve the foregoing problems, an electronic device of the present invention includes: a display module with the above arrangement; and output means for supplying an input video signal to the display module.

With the arrangement, the display module can receive the input video signal from the output means.

In order to solve the foregoing problems, a display device of the present invention includes: a display module with the above arrangement; and a light source section including a light source, the light source section being provided together with the display module.

With the arrangement, in the display module included in the display device, each of the plurality of source drivers includes a memory section for storage of at least data of a video signal to be displayed on a divided region adjacent to said each of the plurality of source drivers. This makes it unnecessary to increase the memory capacity of the timing controller, thereby suppressing cost-up of the timing controller which would be caused by the increase.

Furthermore, with the arrangement, in which the display module included in the display device includes the sync control means, it is possible to synchronize video signals respectively supplied from the plurality of source drivers to the display region. Consequently, even when the display module includes a plurality of source drivers and/or includes no timing controller, the display module allows for satisfactory display by receiving light from the light source section without variations in display between the source drivers.

In order to solve the foregoing problems, a method of the present invention for driving a display module is a method for driving a display module including: a plurality of source drivers respectively provided for a plurality of divided regions each being a part of a display region; and a plurality of memory sections respectively provided for the plurality of source drivers, each of the plurality of memory sections being for storage of at least data of a video signal to be displayed on that one of the plurality of divided regions for which that one of the plurality of source drivers is provided, for which the memory section is provided, the method including the step of synchronizing the plurality of source drivers to synchronously output video signals that the plurality of source drivers output based on data respectively supplied from the plurality of memory sections of the plurality of source drivers, so that the synchronized video signals are supplied to corresponding ones of the plurality of divided regions.

With the arrangement, each of the plurality of source drivers includes a memory section for storage of at least data of a video signal to be displayed on a divided region adjacent to said each of the plurality of source drivers. This allows keeping down an increase in the memory capacity of a timing controller or makes it unnecessary to increase the memory capacity a timing controller, thereby preventing cost-up of the timing controller which would be caused by the increase.

Furthermore, with the arrangement, the step of synchronizing allows synchronizing video signals respectively supplied from the plurality of source drivers to the display region. Consequently, even when the display module includes a plurality of source drivers and/or includes no timing controller, the display module allows for satisfactory display without variations in display between the source drivers.

Advantageous Effects of Invention

The display module in accordance with at least one embodiment of the present invention includes: a plurality of source drivers each including a memory section for storage of an input video signal; and means for synchronizing outputs of data from the memory sections. Accordingly, the display module can deal with high resolution of a display device, and can realize satisfactory display while preventing cost-up of the timing controller.

BRIEF DESCRIPTION OF DRAWINGS

FIG. 2 is a view illustrating a configuration of the source driver in FIG. 1.

FIG. 7 is a view illustrating a modification of the second embodiment of the present invention.

FIG. 8 is a view illustrating another modification of the second embodiment of the present invention.

DESCRIPTION OF EMBODIMENTS

The following description will discuss a display device in accordance with one embodiment of the present invention in detail.

[First Embodiment]

Figure 1:
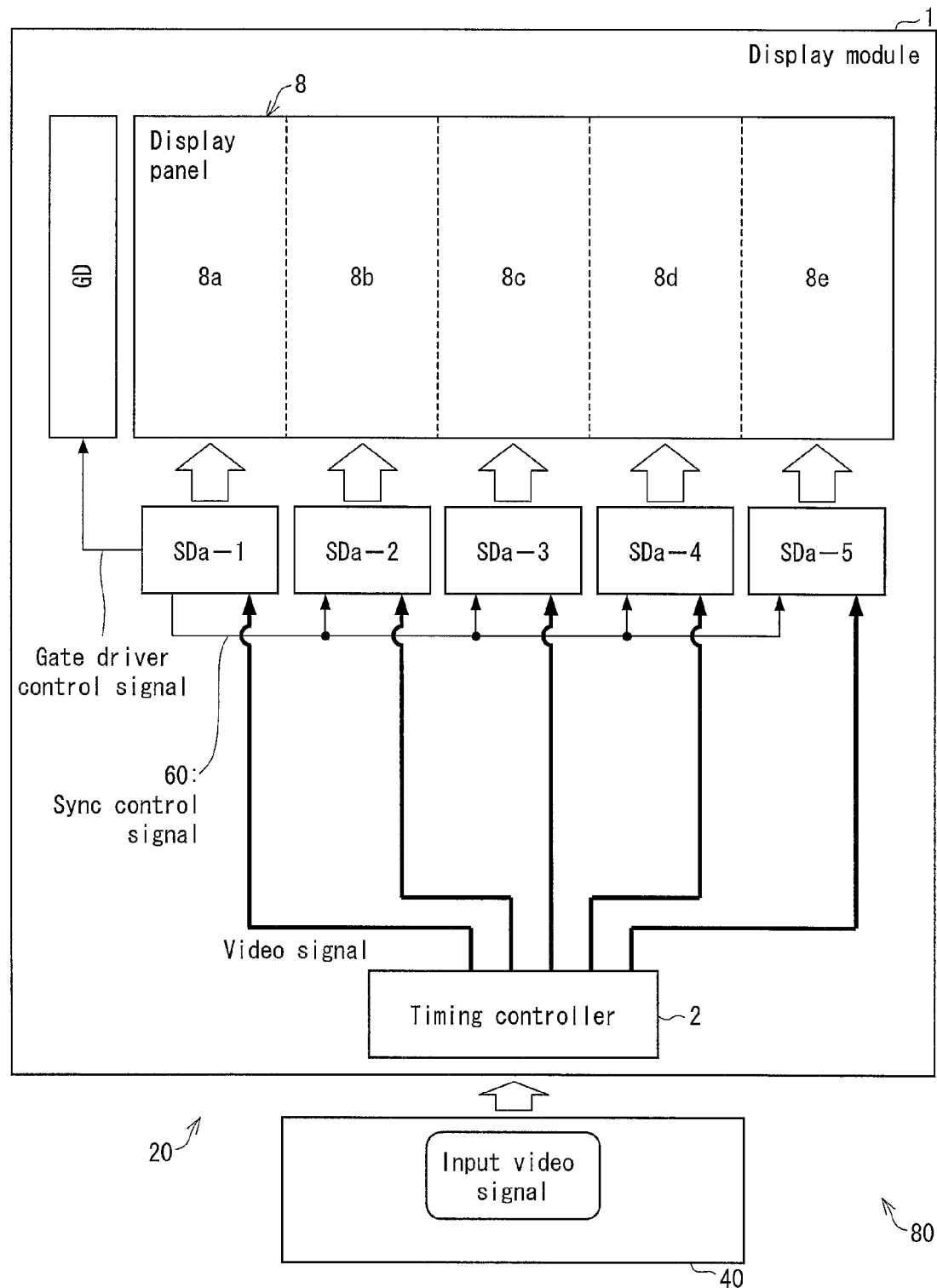
FIG. 1 is a view illustrating a configuration of an electronic device in accordance with one embodiment of the present invention.

With reference to FIG. 1, the following description will discuss an electronic device, a display device, and a display module, each in accordance with First Embodiment of the present invention.

(1) Electronic Device

FIG. 1 is a view illustrating a configuration of an electronic device 80 in accordance with the present embodiment.

The electronic device 80 in accordance with the present embodiment can be mounted on portable electronic devices, such as a car navigation system and a handheld game console, and on electronic devices such as a recorder, a smart phone, and an electronic book reader. Accordingly, as illustrated in FIG. 1, the electronic device 80 includes a display device 20 and a set section 40 (output means) for supplying video signals to source drivers (signal line driving circuits) SDa-1 to SDa-5 in the display device 20.

(2) Display Device

The display device 20 in accordance with the present embodiment, which is included in the electronic device 80 in FIG. 1, includes a display module 1 in FIG. 1 and a backlight module (light source section) (not shown) provided at a backside of the display module 1.

The backlight module includes a backlight light source driving section (not shown), and controls driving of a backlight in accordance with a PWM signal. The PWM signal can be generated by the timing controller 2.

In the present embodiment, the display panel 8 is divided into a plurality of divided regions 8a to 8e, which will be detailed later.

(3) Display Module

The display module 1 illustrated in FIG. 1 is a module for displaying a video image (image) in accordance with an input video signal supplied from the set section 40. Accordingly, as illustrated in FIG. 1, the display module 1 includes the timing controller 2, the display panel 8, and a plurality of source drivers (first source driver SDa-1 to fifth source driver SDa-5), and a gate driver GD.

(Timing Controller)

The timing controller 2 receives an input video signal from the set section 40, divides the input video signal into a plurality of video data respectively corresponding to the divided regions 8a to 8e, and supplies the plurality of video data to memory sections 30a and 30b (FIG. 2) provided in corresponding source drivers (SDa-1 to SDa-5), respectively.

Furthermore, the timing controller 2 supplies a clock signal, a horizontal sync signal, and a vertical sync signal to the source drivers (SDa-1 to SDa-5).

Figure 3:
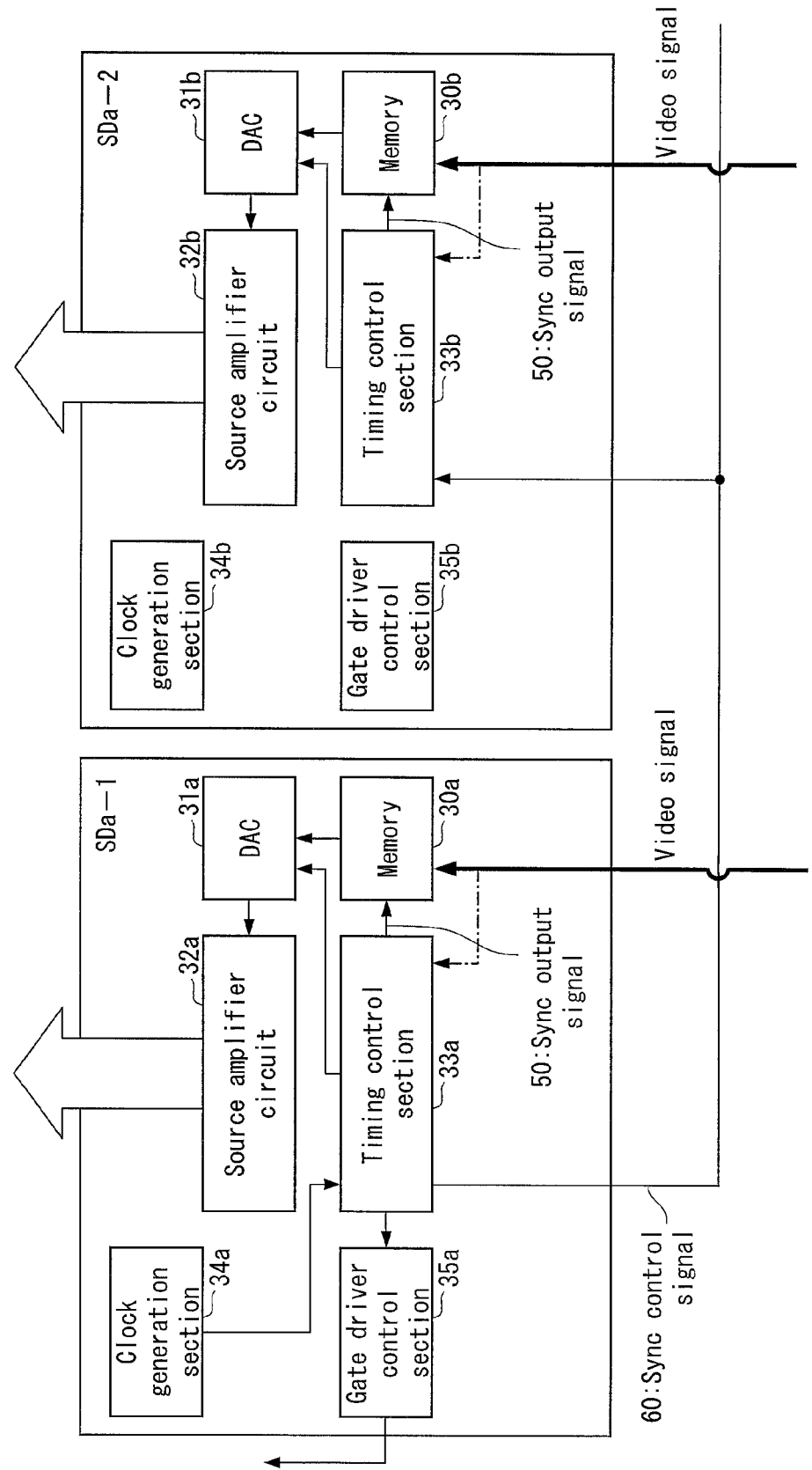
FIG. 3 is a view illustrating a modification of the embodiment of the present invention.

By a first timing control section 33a receiving a clock signal, a horizontal sync signal, and a vertical sync signal from outside, it is possible to synchronize the source driver with the signals supplied from outside. Accordingly, in order to synchronize the source driver with the signals supplied from outside, a clock signal, a horizontal sync signal, and a vertical sync signal from the timing controller 2 are supplied to the timing control section 33 (FIG. 2) provided in each of the source drivers (SDa-1 to SDa-5), as shown by dashed-line arrows in FIG. 3.

The timing controller 2 does not include a frame memory for one frame as in the conventional art. However, the timing controller 2 may include a line memory for a plurality of lines for the purpose of processing a partial image or other purposes.

(Display Panel)

The display panel 8 (display region) includes pixel arrays.

The pixel arrays are configured such that pixels are positioned near intersections of a large number of gate bus lines and a large number of source bus lines which cross the large number of gate bus lines, so that the pixels form a matrix. Each pixel is connected with an adjacent gate bus line and an adjacent source bus line.

For example, in a case of a liquid crystal display device which displays colors based on primary colors of R (red), G, (green), and B (blue), one color is expressed with use of three pixels of R, G, and B.

A substrate structure which constitutes the pixel arrays includes, for example, an active matrix substrate having pixel electrodes and an alignment layer on an insulating substrate, a counter substrate having a common electrode and an alignment layer on another insulating substrate, and a liquid crystal layer provided between the active matrix substrate and the counter substrate. Each of the active matrix substrate and the counter substrate may be provided with a polarizer (not shown). Each of the pixels is defined by a pixel electrode. The display panel may operate in a VA mode for example.

For convenience, the present invention may be considered as having a configuration in which the display panel 8 is divided into a plurality of regions. In the present embodiment, the display panel 8 (display region) is divided along a direction in which the source bus lines extend, so that the display panel 8 has, for the sake of easy explanation, five divided regions 8a to 8e. The wording "divided" encompass not only a state where a panel is divided functionally but also a state where a panel is divided structurally. In the following, the present embodiment is explained based on the state where a panel is divided functionally.

In the present embodiment, the regions thus divided are provided with corresponding source drivers, respectively. That is, the plurality of source bus lines in the display region are grouped into a plurality of groups provided with individual source drivers, respectively. The source bus lines connected with the source driver receive a video signal (image data) from the source driver. This will be detailed later.

The gate bus lines of the pixel arrays are connected with the gate driver GD. A scanning signal is supplied from the gate driver GD to the gate bus lines. In the present embodiment, all the gate bus lines are connected with one gate driver GD.

The display panel 8, the plurality of source drivers (first source driver SDa-1 to fifth source driver SDa-5), and the gate driver GD can be provided on the same substrate.

(Source Driver)

A feature of the present invention lies in a configuration of the source drivers. The following description will discuss a detailed configuration of the source drivers and a mechanism for driving and controlling the source drivers.

As described above, the five divided regions 8a to 8e of the display panel 8 are provided with corresponding source drivers, respectively. The five divided regions 8a to 8e are provided at one side of the display panel 8 so as to be along a direction in which the gate bus lines extend. The first source driver SDa-1 corresponds to the first divided region 8a, the second source driver SDa-2 corresponds to the second divided region 8b, the third source driver SDa-3 corresponds to the third divided region 8c, The fourth source driver SDa-4 corresponds to the fourth divided region 8d, and the fifth source driver SDa-5 corresponds to the fifth divided region 8e.

The number of division of the display panel 8 and the number of the source drivers to be provided are not limited to those in the present embodiment. Any number of the source drivers to be provided may be provided, provided that the source drivers as many as the number of the division of the display panel 8 are provided.

In the present embodiment, the source drivers write video signals (image data) in the corresponding divided regions. The video signals to be written in the divided regions are supplied from the timing controller 2, as described above.

In the present embodiment, each source driver is provided with a memory section for temporal storage of a video signal having been supplied to the source driver. The video signal stored in the memory section is supplied from the memory section at appropriate timing and finally written in the source bus line.

In the present embodiment, there are provided a plurality of source drivers, each of which is provided with a memory section. Accordingly, if each source driver supplies a video signal stored in the memory section at independent timing, there would be variations in display, thereby impairing display quality greatly. In order to deal with this, the plurality of source drivers provided in the display module in accordance with the present embodiment synchronize video signals from their respective memory sections.

Specifically, synchronization of the timing mentioned above is controlled by the first source driver SDa-1 which is one of the plurality of source drivers (five source drivers SDa-1 to SDa-5 in the present embodiment). In the following, the source drivers will be described in detail, explaining the synchronization control.

FIG. 2 is a view illustrating a configuration of the source driver. For convenience, FIG. 2 illustrates only the first source driver SDa-1 and the second source driver SDa-2 provided adjacently to the first source driver SDa-1. Since the third source driver SDa-3 to the fifth source driver SDa-5 illustrated in FIG. 1 have the same configuration and mechanism as those of the second source driver SDa-2, explanations thereof are substituted with the explanation of the second source driver SDa-2.

As illustrated in FIG. 2, the first source driver SDa-1 includes a first memory section 30a, a first DAC 31a, a first source amplifier circuit 32a, a first timing control section 33a (sync control means), a first clock generation section 34a (sync control means), and a first gate driver control section 35a. Similarly with the first gate driver SDa-1, the second (third to fifth) source driver SDa-2 includes a second memory section 30b, a second DAC 31b, a second source amplifier circuit 32b, a second timing control section 33b, a second clock generation section 34b, and a second gate driver control section 35b.

The first memory section 30a and the second memory section 30b are used for storage of a video signal supplied from the timing controller 2.

The capacity of each of the first memory section 30a and the second memory section 30b should be so large that at least video data to be displayed on the divided region to which the source driver including the first memory section 30a or the second memory section 30b belongs can be stored in the first memory section 30a or the second memory section 30b. That is, a lower limit of the capacity of each of the first memory section 30a and the second memory section 30b should be a capacity just enough to store video data to be displayed on the corresponding divided region.

On the other hand, an upper limit of each of the first memory section 30a and the second memory section 30b should be a capacity not exceeding an amount of video data to be displayed on the display panel 8 as a whole. Setting the upper limit as above allows for prevention of cost-up while preventing the capacity of each memory section from being too large.

As specific examples, each memory section may be a memory with a capacity of 8 bit tones for each color, a memory with a capacity of 6 bit tones for each color, or a memory with a capacity which allows monochrome display for the purpose of reducing capacity (cost) and power consumption. The present invention is not limited to these.

Video signals from the first memory section 30a and the second memory section 30b are supplied to the first DAC 31a and the second DAC 31b, respectively.

The first DAC (Digital Analog Converter) 31a and the second DAC 31b convert video signals which are digital signals into analog signals, and supply the analog signals to the first source amplifier circuit 32a and the second source amplifier circuit 32b, respectively.

The first source amplifier circuit 32a and the second source amplifier circuit 32b amplify voltages, currents, or powers of the received signals, and supply video signals to the source bus lines.

Timings to supply video signals from the first memory section 30a and the second memory section 30b are controlled by the first source driver SDa-1 as described above. That is, the first source driver SDa-1 (sync control means) has a control mechanism different from a control mechanism for the second source driver SDa-2 to fifth source driver SDa-5 (FIG. 1). Accordingly, the following description will separately discuss the control mechanism for the first source driver SDa-1 and the control mechanism for the second (fifth) source driver SDa-2 (to SDa-5) which control mechanism is under control of the first source driver SDa-1 (step of synchronizing).

First Source Driver

A video signal from the timing controller 2 is temporarily stored in the first memory section 30a of the first source driver SDa-1.

In addition, the first timing control section 33a receives a clock signal generated by the first clock generation section 34a provided in the first source driver SDa-1.

The first timing control section 33a generates, in accordance with the clock signal generated by the first clock generation section 34a, a sync output signal 50 which causes the first memory section 30a in the first source driver SDa-1 to supply a video signal stored in the first memory section 30a. Then, the first timing control section 33a supplies the sync output signal 50 to the first memory section 30a.

Besides, the first timing control section 33a generates, in accordance with the clock signal generated by the first clock generation section 34a, a sync control signal 60 (sync signal) for controlling output of a video signal from the second memory section 30b in the second source driver SDa-2. Then, the first timing control section 33a supplies the sync control signal 60 to the second (third to fifth) source driver SDa-2.

Furthermore, in accordance with the clock signal generated by the first clock generation section 34a, the first timing control section 33a supplies, to the gate driver control section 35a in the first source driver SDa-1, the clock signal generated by the clock generation section, a predetermined horizontal sync signal, and a predetermined vertical sync signal.

In accordance with the clock signal, the horizontal sync signal, and the vertical sync signal, the gate driver control section 35a controls the gate driver illustrated in FIG. 1. As described above, since the control section for controlling the gate driver is provided in the first source driver SDa-1, it is unnecessary to provide such a control section. This unnecessitates a space where such a control section would be provided.

Second (Third to Fifth) Source Driver

The sync control signal 60 generated by the first timing control section 33a and supplied to the outside of the first source driver SDa-1 is supplied to the second timing control section 33b in the second source driver SDa-2.

In accordance with the sync control signal 60, the second timing control section 33b supplies, to the second memory section 30b in the second source driver SDa-2, the sync output signal 50 which causes the second memory section 30b to supply a video signal stored in the second memory section 30b.

That is, although the second source driver SDa-2 includes the second clock generation section 34b, the second clock generation section 34b neither generates a clock signal nor supplies a clock signal to the second timing control section 33b. Similarly, although the second source driver SDa-2 includes the second gate driver control section 35b, the second gate driver control section 35b does not operate. This is intended for reducing costs by designing all the source drivers to have the same configuration (which allows mass production of minor products). If this point is not taken into account, the second (to fifth) source driver SDa-2 (to SDa-5) is not required to include the clock generation section 34b and the gate driver control section 35b.

Outputs from All Source Drivers

The first memory section 30a and the second memory section 30b which have received the sync output signal 50 are synchronized with each other in terms of the timing at which the first memory section 30a and the second memory section 30b outputs video signals. The synchronization finally results in synchronization between video signals respectively supplied from the first source amplifier circuit 32a and the second source amplifier circuit 32b to the source bus lines.

Here, the first timing control section 33a and the second timing control section 33b supply, to the first DAC circuit 31a and the second DAC circuit 31b, signals for controlling the polarities of signals to be outputted from the first DAC circuit 31a and the second DAC circuit 31b, respectively. This is required when driving a display panel which requires alternate driving, such as a liquid crystal panel.

(4) Effect Yielded by First Embodiment

As described above, with the present embodiment, the plurality of source drivers SDa-1 to SDa-5 include respective memory sections in which at least data of respective video signals to be displayed on the respective divided regions adjacent to the source drivers SDa-1 to SDa-5 are stored. This allows preventing an increase in memory capacity of the timing controller 2, thereby preventing cost-up of the timing controller 2 which would be caused due to the increase.

Furthermore, with the present embodiment, the first timing control section 33a of the first source driver SDa-1 can synchronize video signals supplied from the plurality of source drivers SDa-1 to SDa-5 to the corresponding divided regions. That is, with the present embodiment, in accordance with the clock signal generated by the first clock generation section 34a, the first timing control section 33a of the first source driver SDa-1 generates the sync control signal 60 for causing the first source driver SDa-1 to the fifth source driver SDa-5 to synchronously supply respective video data to the source bus lines. Then, the sync control signal 60 is supplied from the first timing control section 33a to the second source driver SDa-2 to the fifth source driver SDa-5.

Consequently, even in a case where the plurality of source drivers SDa-1 to SDa-5 are provided and/or the timing controller 2 is not provided, variations in display between the source drivers do not occur, resulting in satisfactory display.

Furthermore, with use of the first source driver SDa-1, it is possible to control video signals so that the video signals are synchronously supplied from the respective source drivers. This unnecessitates providing a timing control section, thereby allowing for simplified configurations of the source drivers and their peripherals.

As described above, in the present invention, video signals are stored in memories of the respective source drivers, and the source drivers synchronously supply the respective video signals from the memories. This ultimately causes the source drivers to supply the respective video signals at once to the source bus lines.

(5) First Modification

In the aforementioned embodiment, the sync control signal 60 is generated in accordance with the clock signal generated by the first clock generation section 34a, and the sync control signal 60 is supplied from the first source driver SDa-1 to other source drivers, i.e. the second source driver SDa-2 to the fifth source driver SDa-5.

Figure 4:
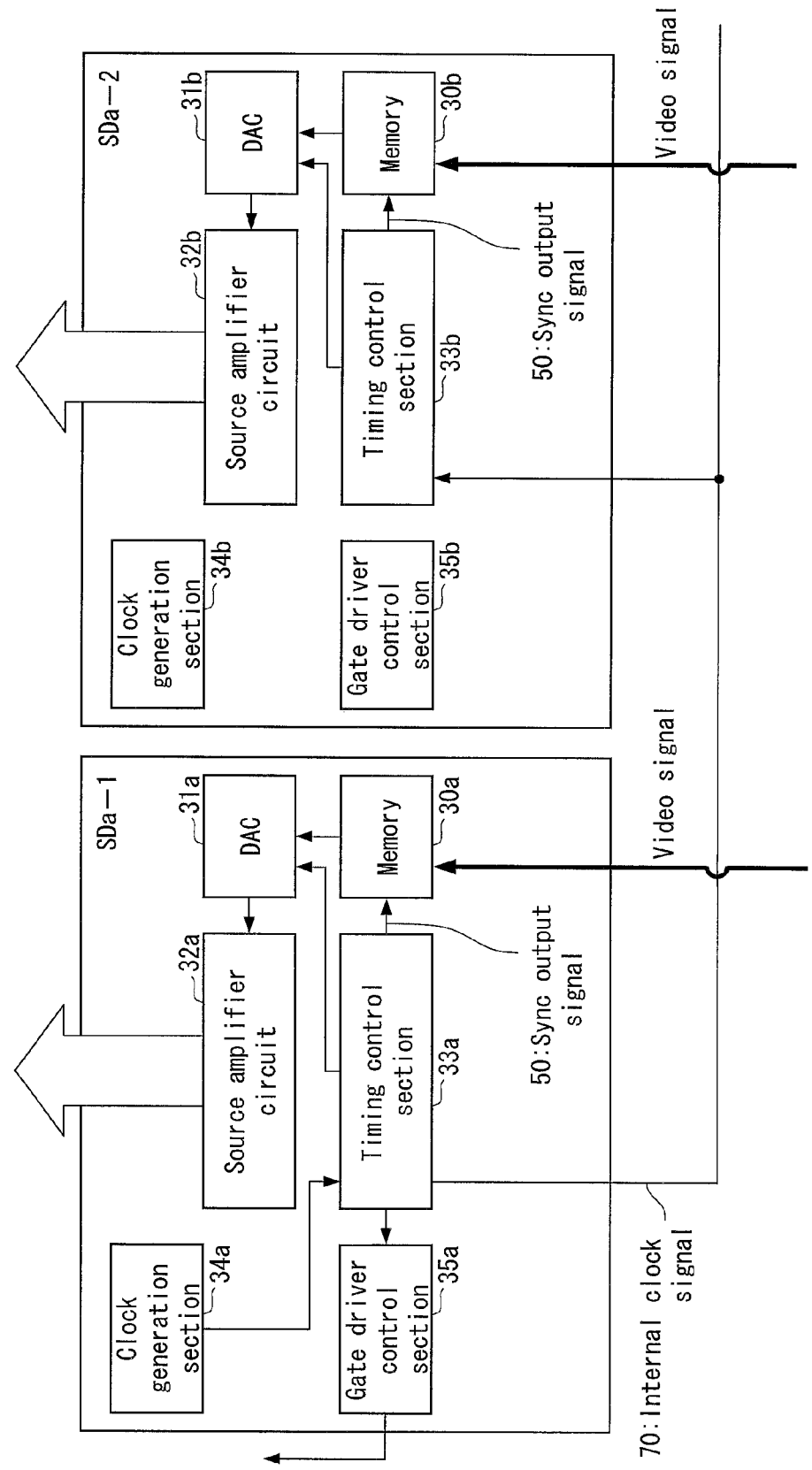
FIG. 4 is a view illustrating a modification of the embodiment of the present invention.

However, the present invention is not limited to this, and may be modified as described below. FIG. 4 illustrates a modification, illustrating a part corresponding to the configuration illustrated in FIG. 2.

In the present modification, as illustrated in FIG. 4, a timing control section 33a of a first source driver SDa-1 supplies an internal clock signal 70 to other source drivers, i.e. second source driver SDa-2 to the fifth source driver SDa-5.

The present modification is configured such that, in accordance with a clock signal generated by a first clock generation section 34a, the first timing control section 33a generates the internal control signal 70 for causing the first source driver SDa-1 to the fifth source driver SDa-5 to synchronously supply respective video data to the source bus lines. Then, the internal control signal 70 is supplied from the first timing control section 33a to the second source driver SDa-2 to the fifth source driver SDa-5. Furthermore, in the first source driver SDa-1, a sync output signal 50 is generated at the same time with generation of the internal clock signal 70, and is supplied to the first memory section 30a.

However, the aforementioned embodiment in which the sync control signal 60 is transferred to other source drivers is easier in terms of wiring design since lower frequency is required. That is, the aforementioned embodiment allows for speed-up of development and/or cost down.

(6) Second Modification

In the present embodiment, one source driver is provided for one divided region. For example, in a case where one divided region includes n-th row to n+99-th row of source bus lines, one source driver is provided for the n-th row to n+99-th row of source bus lines.

However, the present invention is not limited to this configuration. For example, there may be employed a configuration in which a source driver can drive a pixel row (e.g. n−1-th row and/or n+100-th row) for which the source driver is not provided as a source driver for driving a divided region to which the pixel row belongs and which is adjacent to a divided region to which the source driver corresponds.

For example, there is a display panel in which a plurality of pixels constituting a certain pixel row extending vertically to the gate bus lines are electrically connected, along a row direction, alternately with different source drivers, one of the different source drivers being electrically connected with one of pixel rows provided at both sides of the certain pixel row, and the other of the different source drivers being electrically connected with the other of the pixel rows. In driving, source drivers at the both sides of the pixel row supply video signals with opposite polarities to alternative ones of the pixels arranged in the row direction, so that the polarities of pixels are alternated along the row direction.

This allows the display panel as a whole to realize display in which pixels with different polarities are distributed in a dot-like manner. The display panel having such a configuration is preferable because it can prevent flickers. When this configuration is seen in terms of one source bus line, it is found that the source bus line is alternately connected with a pixel at a right side and a pixel at a left side in a direction in which the source bus line extends.

In this configuration, in order to drive a pixel row at a boundary of one divided region, it is necessary to drive a source bus line in an adjacent divided region. In such a case, there may be employed the aforementioned configuration in which a source driver is also connected with a source bus line for a divided region to which the source driver does not belongs.

[Second Embodiment]

(1) Configuration of Display Module in Accordance with Second Embodiment

Figure 5:
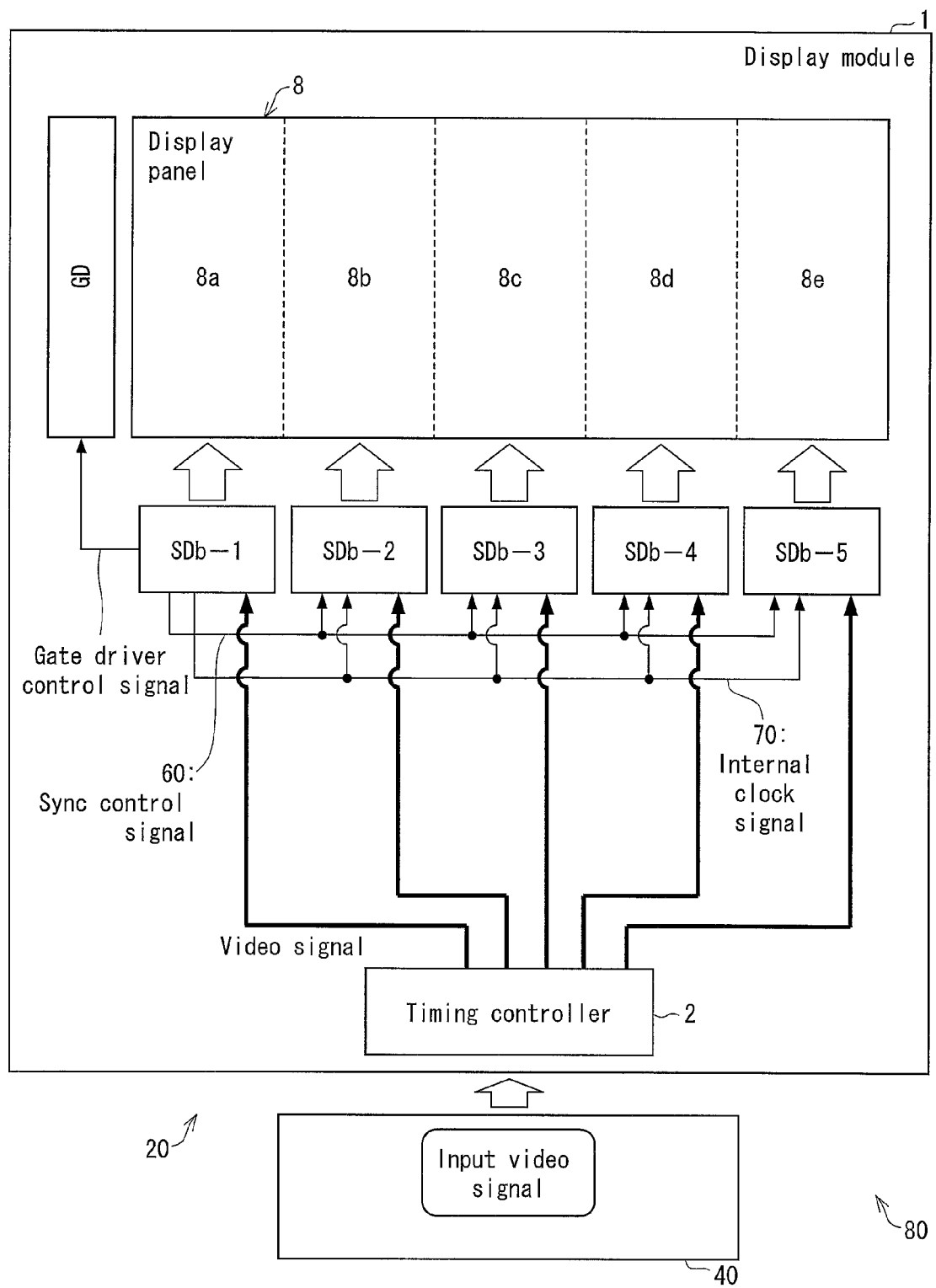
FIG. 5 is a view illustrating a display module in accordance with another (second) embodiment of the present invention.
Figure 6:
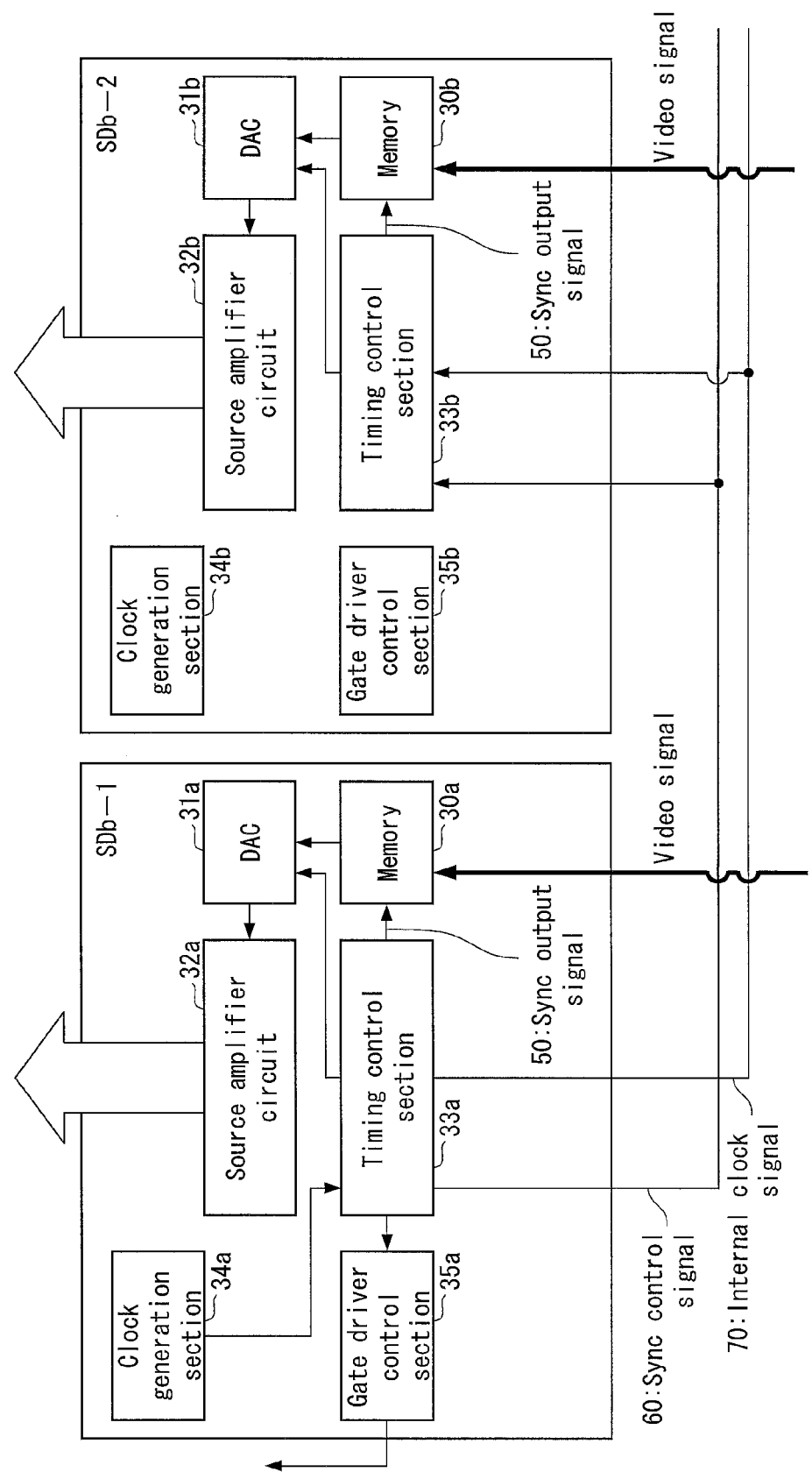
FIG. 6 is a view illustrating a configuration of the source driver in FIG. 5 and its peripherals.

The following description will discuss a display module in accordance with Second Embodiment of the present invention, with reference to FIGS. 5 and 6. For convenience, members having the same functions as those in the drawings referred to in First Embodiment are given the same reference signs and explanations thereof are omitted.

FIG. 5 is a view illustrating a configuration of a display module in accordance with the present embodiment, which configuration corresponds to the FIG. 1 configuration in accordance with First Embodiment. FIG. 6 is a view illustrating a configuration of a source driver and its peripherals in accordance with the present embodiment, which configuration corresponds to the FIG. 2 configuration in accordance with First Embodiment.

As illustrated in FIG. 2, in the display module in accordance with First Embodiment, the sync control signal is supplied to the second (to fifth) source driver SDa-2. Furthermore, as illustrated in FIG. 4, in the modifications of First Embodiment, the internal clock signal instead of the sync control signal is supplied to the second source driver SDa-2 to the fifth source driver SDa-5.

In contrast, in the present embodiment, as illustrated in FIGS. 5 and 6, both of a sync control signal and an internal clock signal are supplied as sync signals from a first source driver SDb-1 to a second source driver SDb-2 to a fifth source driver SDb-5.

The first source driver SDb-1 mounted on the display module in accordance with the present embodiment generates a sync control signal 60 and an internal clock signal 70 in accordance with a clock signal generated by a first clock generation section 34a as in First Embodiment.

(2) Effect of Second Embodiment

By supplying the sync control signal 60 and the internal clock signal 70 as sync control signals from the first source driver SDb-1 to the second source driver SDb-2 to the fifth source driver SDb-5 as in the present embodiment, it is possible to make more exact synchronization among the source drivers.

(3) Third Modification

A modification is described here in which how video signals are transferred from a timing controller 2 to respective source drivers is modified.

In the present embodiment, as in First Embodiment, video signals are transferred from the timing controller 2 to all the source drivers SD at a constant amount per predetermined time.

However, the present invention is not limited to this. The timing controller may be configured such that in a case where update of a displayed image is not required, the timing controller decreases an amount of transferring a video signal to at least one source driver per predetermined time, or stops transferring a video signal to at least one source driver.

Specifically, this configuration may be carried out as illustrated in FIG. 7. In a case where there is no change in a displayed image, the timing controller 2 may decrease an amount of transferring a video signal to each source driver, or may stop transferring a video signal to each source driver.

With the present modification, by controlling transferring of a video signal from the timing controller to each source driver, it is possible to reduce power consumption required for transferring a video signal from the timing controller to the source driver.

(4) Fourth Modification

The present modification performs controlling identical with that in the third modification except that the controlling herein is performed with respect to each divided region, i.e. each source driver, as illustrated in FIG. 8.

As described above, by performing controlling with respect to each source driver, it is possible to reduce power consumption of a circuit in the timing controller which circuit transfers a signal to a source driver.

[Third Embodiment]

(1) Configuration of Display Module in Accordance with Third Embodiment

Figure 9:
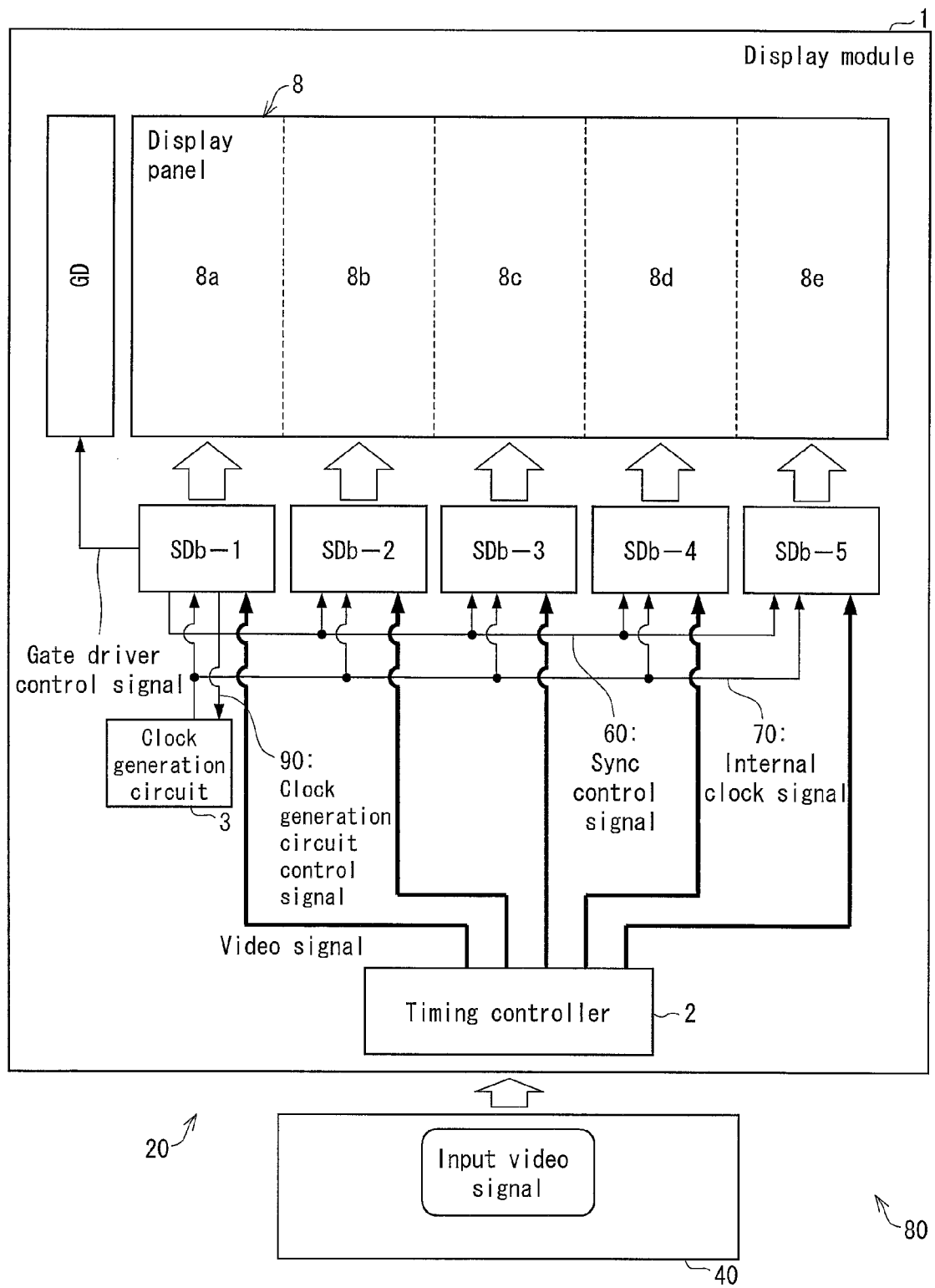
FIG. 9 is a view illustrating a display module in accordance with another (third) embodiment of the present invention.
Figure 10:
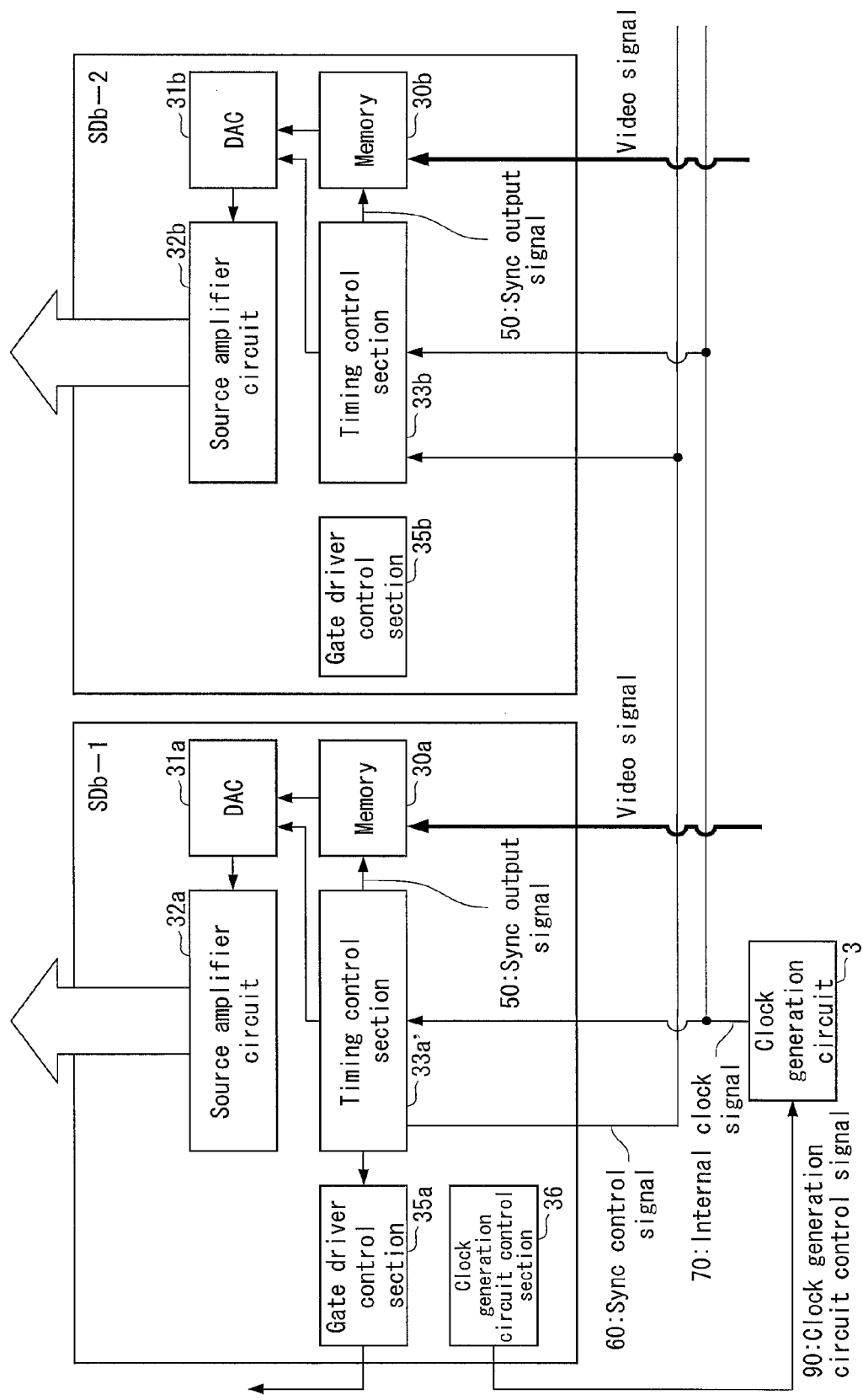
FIG. 10 is a view illustrating a configuration of the source driver in FIG. 9 and its peripherals.

The following description will discuss a display module in accordance with Third Embodiment of the present invention, with reference to FIGS. 9 and 10. For convenience, members having the same functions as those in the drawings referred to in First Embodiment are given the same reference signs and explanations thereof are omitted.

FIG. 9 is a view illustrating a configuration of a display module in accordance with Third Embodiment, which configuration corresponds to the FIG. 1 configuration in accordance with First Embodiment. FIG. 10 is a view illustrating a configuration of a source driver and its peripherals in accordance with Third Embodiment, which configuration corresponds to the FIG. 2 configuration in accordance with First Embodiment.

In First Embodiment, each of the plurality of source drivers includes a clock generation section, and the first clock generation section 34a of the first source driver SDa-1 generates a clock signal and supplies the clock signal to the first timing control section 33a.

In contrast, in a display module in accordance with the present embodiment, each source driver includes no clock generation section. Instead, a clock generation circuit 3 (sync control means) is provided near a first source driver in the display module.

In addition, in the present embodiment, as illustrated in FIG. 10, a first source driver SDb-1 includes a clock generation circuit control section 36 (sync control means, clock generation control section) for controlling the clock generation circuit 3.

The clock generation circuit control section 36 generates a clock generation control signal 90 in accordance with a signal-rising command from a timing controller or a controller provided in the set section, and supplies the clock generation control signal 90 to the clock generation circuit 3.

Upon reception of the clock generation control signal 90, the clock generation circuit 3 generates a clock signal and supplies the clock signal to a first timing control section 33a' of the first source driver SDb-1.

In addition, the clock generation circuit 3 supplies the generated clock signal as an internal clock signal to a second timing control section 33b of a second (to fifth) source driver SDb-2.

In the present embodiment, the first timing control section 33a' (sync control means, internal sync signal generation section) provided in the first source driver SDb-1 is different from the corresponding section of First Embodiment.

Specifically, in First Embodiment, the timing control section 33a receives a clock signal from the first clock generation section 34a. In contrast, as described above, in Third Embodiment, the first timing control section 33a' of the first source driver SDb-1 receives a clock signal from the clock generation circuit 3 provided outside the first source driver SDb-1.

Then, the first timing control section 33a' in accordance with Third Embodiment generates, in accordance with the clock signal from the clock generation circuit 3, a sync output signal 50 (internal sync signal) which causes a first memory section 30a in the first source driver SDb-1 to supply a video signal stored in the first memory section 30a, and supplies the sync output signal 50 to the first memory section 30a.

In addition, the first timing control section 33a' in accordance with the present embodiment generates, in accordance with the clock signal from the clock generation circuit 3, a sync control signal 60 (internal sync signal) for controlling an output of a video signal from a second memory section 30b of the second source driver SDb-2, and supplies the sync control signal 60 to the second (third to fifth) source driver SDb-2.

That is, the second timing control section 33b of the second (to fifth) source driver SDb-2 receives, as an internal clock signal, the sync control signal 60 generated by the first timing control section 33a' and the clock signal generated by the clock generation circuit 3.

(2) Effect of Third Embodiment

In a case where a clock generation section is provided in a source driver as in First Embodiment, the clock generation section is made of a CR circuit, which may result in variations in clock signal. In contrast, providing the clock generation circuit 3 outside the source driver as in Third Embodiment allows the clock generation circuit to be configured more accurately, allowing synchronized outputs of video signals which is an object of the present invention to be realized more accurately.

(3) Fifth Modification

A modification is described here in which where the first source driver and the clock generation circuit 4 are provided is modified.

In the present embodiment as well as in First and Second Embodiments, the first source driver for generating a sync signal is provided at a position corresponding to the divided region 8a closest to the gate driver GD.

Figure 11:
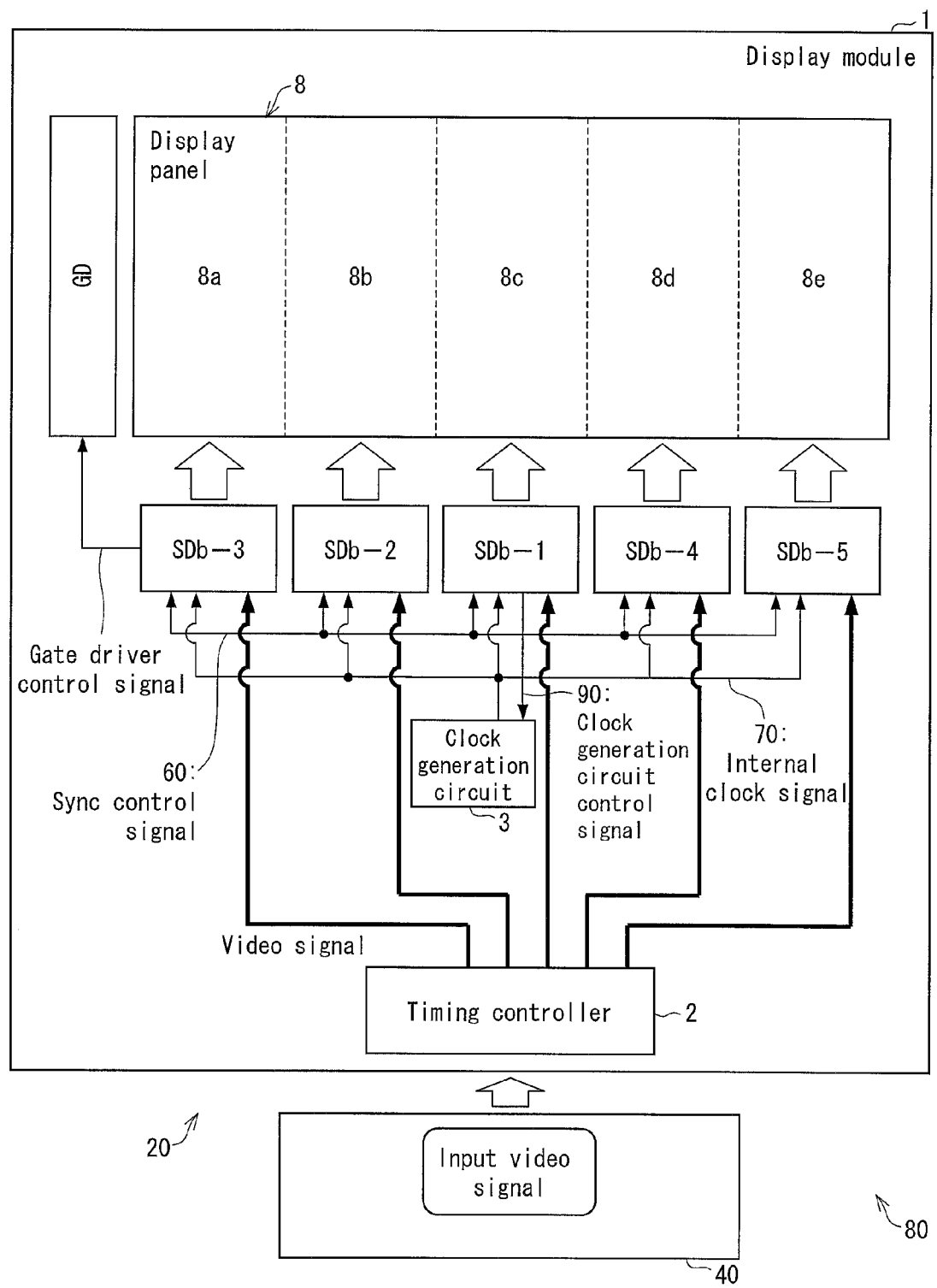
FIG. 11 is a view illustrating a modification of the third embodiment of the present invention.
Figure 12:
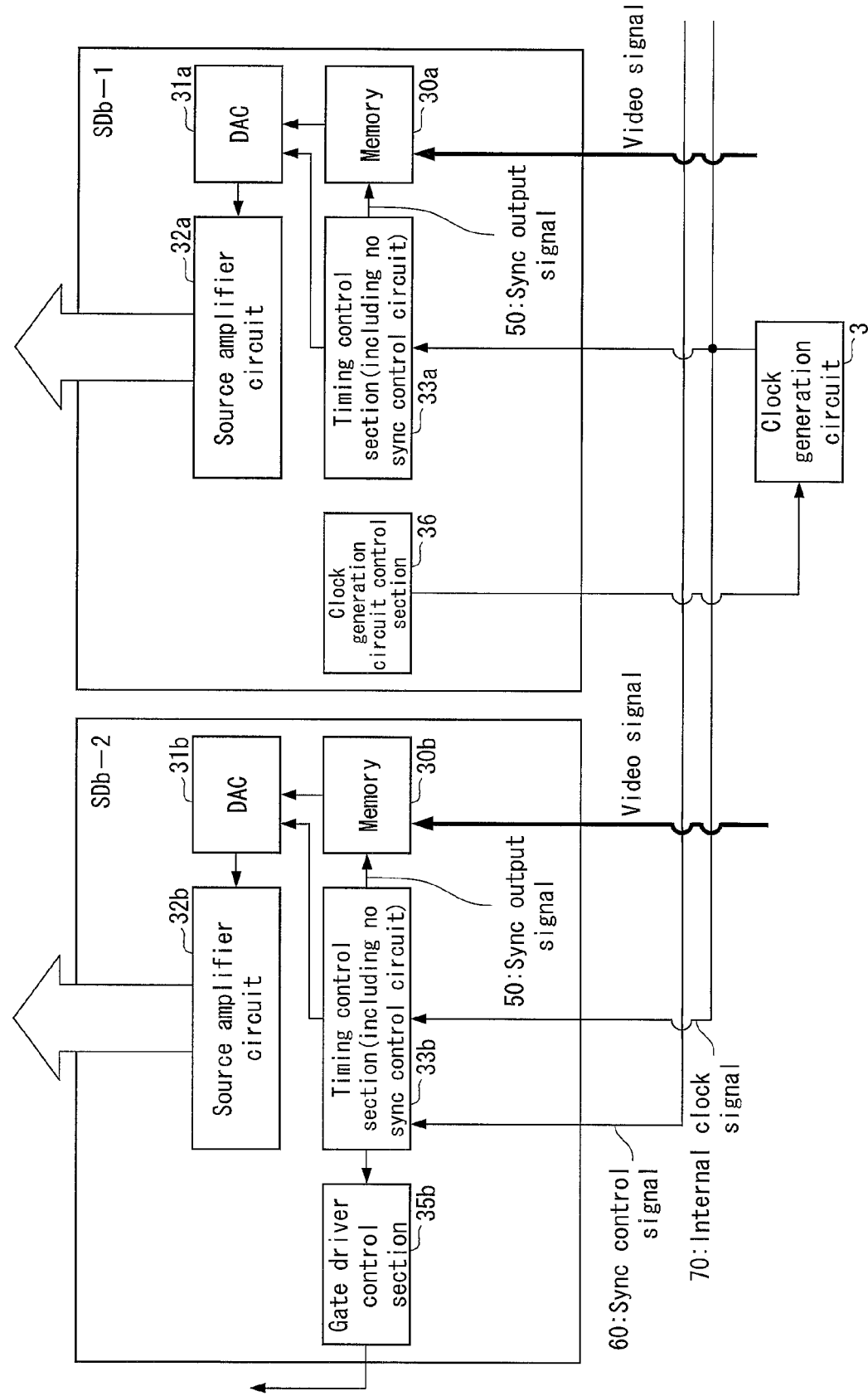
FIG. 12 is a view illustrating another modification of the third embodiment of the present invention.

However, the present invention is not limited to this. In the present modification, as illustrated in FIGS. 11 and 12, a first source driver for generating a sync signal is provided at a position corresponding to a third divided region 8c at the center of a display panel 8. This configuration makes it possible to shorten the length of a wire via which a sync signal is supplied from the first source driver to other source drivers, compared to a case where the first source driver is provided at an end farthest from the center.

This configuration can be considered as a configuration in which the first source driver for generating a sync signal is provided at a middle position in a row of source drivers. In the present modification, since the source drivers are provided for five divided regions, respectively, the source driver provided for the third divided region is defined as a first source driver. In a case where the display region is divided into different number of regions, a source driver for a divided region at a middle position (center) is defined as a first source driver. This configuration is particularly effective for a display module including a large display panel.

Furthermore, in the present modification, the clock generation circuit 3 is provided close to the first source driver provided at the middle position in the row of the source drivers, so that the length of a wire between the clock generation circuit control section 36 and the clock generation circuit 3 is shorter. As is true with both the present modification and the present embodiment, the length of a wire being shorter is preferable because it can prevent delay in transmission of signals.

The present modification is described based on a configuration in which the sync control signal 60 and the internal clock signal generated by the clock generation circuit 3 are supplied. However, it should be noted that the present modification is applicable to First Embodiment and the first modification described above. That is, the present modification may be applied to a configuration in which the first timing control section receives a clock signal generated outside, generates the sync control signal 60 or an internal clock signal, and supplies the sync control signal 60 or the internal clock signal to other source drivers.

(4) Sixth Modification

Figure 13:
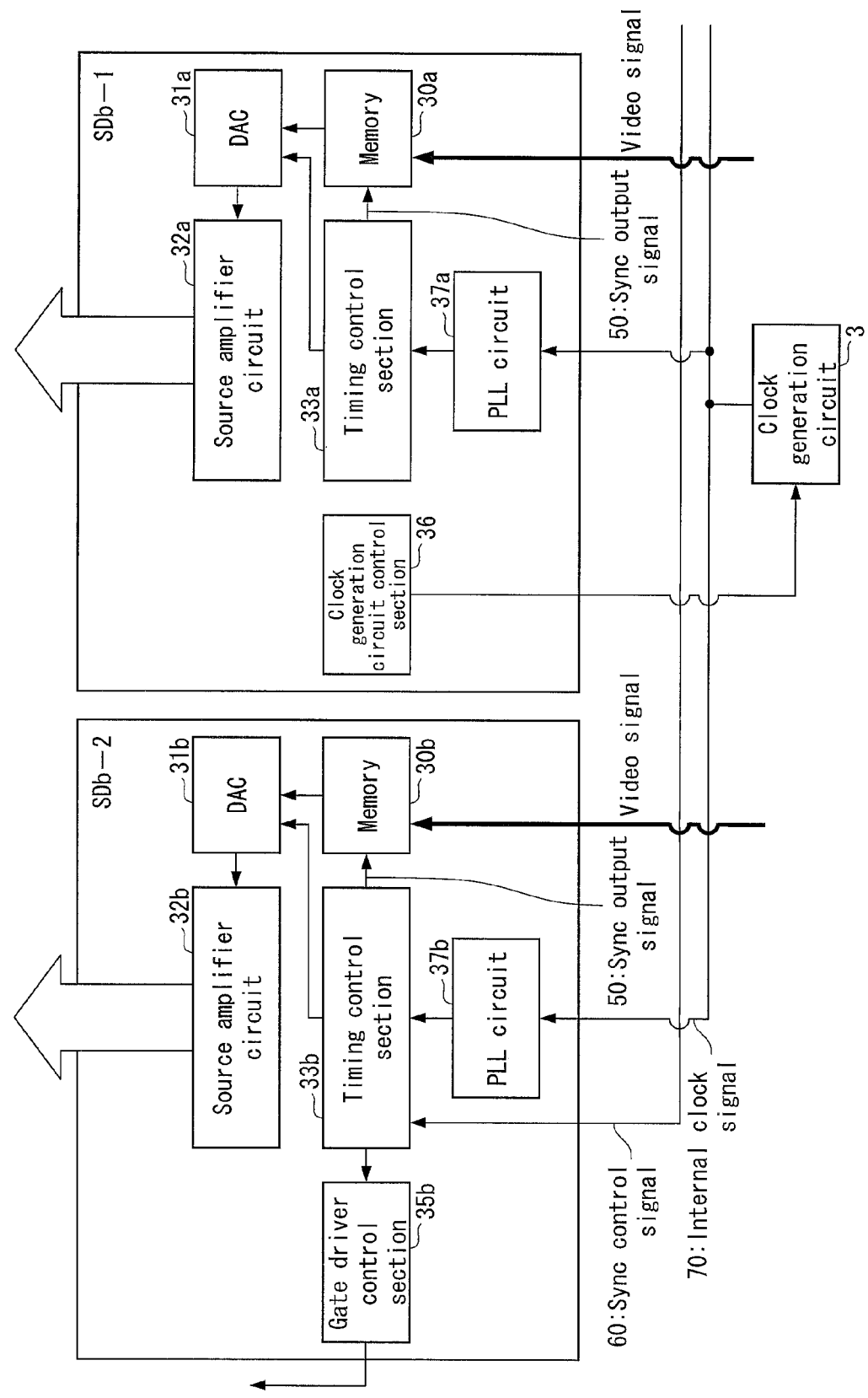
FIG. 13 is a view illustrating another modification of the third embodiment of the present invention.

The following description will discuss still another modification with reference to FIG. 13.

In the present embodiment and the fifth modification, a (internal) clock signal generated by the clock generation circuit 3 is directly supplied to the timing control section.

In contrast, in the present modification, a (internal) clock signal generated by the clock generation circuit 3 is supplied to a PLL (Phase Locked Loop) circuit, and a (internal) clock signal outputted from the PLL circuit 37 is supplied to the timing control section.

The PLL circuit 37 is a conventional and well-known PLL circuit, and generates a multiplied wave. Intermediation of the PLL circuit allows the clock generation circuit 3 to be configured to generate a clock signal with low frequency.

In order to increase execution speed of a display device, operation frequency is required to be higher. However, as the operation frequency is higher, the display device is more greatly influenced by variations in signals. Consequently, if a clock signal generated by the clock generation circuit 3 has high frequency, the display device may suffer such an influence. In order to deal with this, there is provided the PLL circuit 37 which changes a clock signal to have high frequency as in the present modification. This allows the clock generation circuit 3 to generate a clock signal with low frequency, i.e. a clock signal with little variation.

[Fourth Embodiment]

(1) Configuration of Display Module in Accordance with Fourth Embodiment

Figure 14:
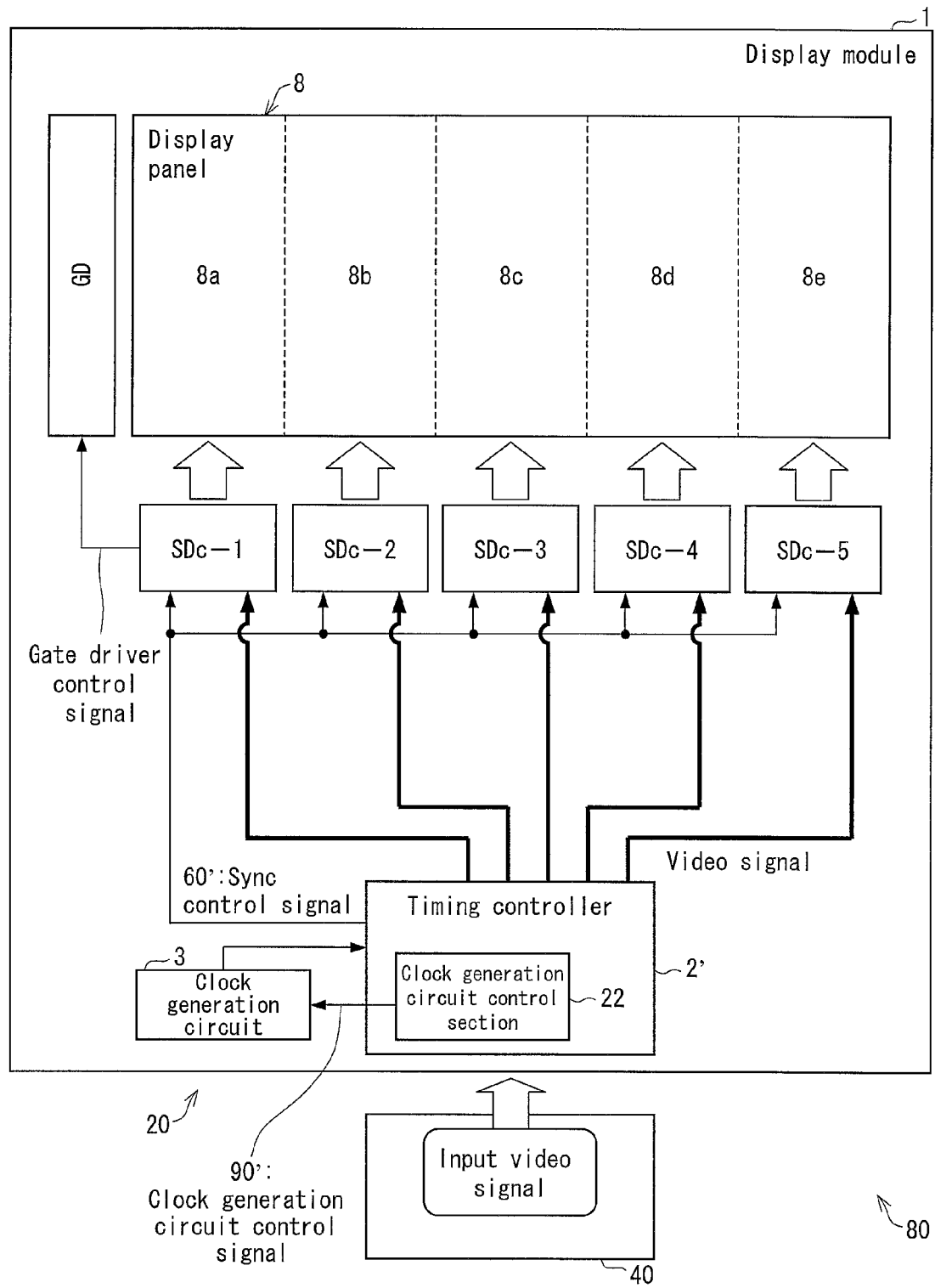
FIG. 14 is a view illustrating a display module in accordance with another (fourth) embodiment of the present invention.
Figure 15:
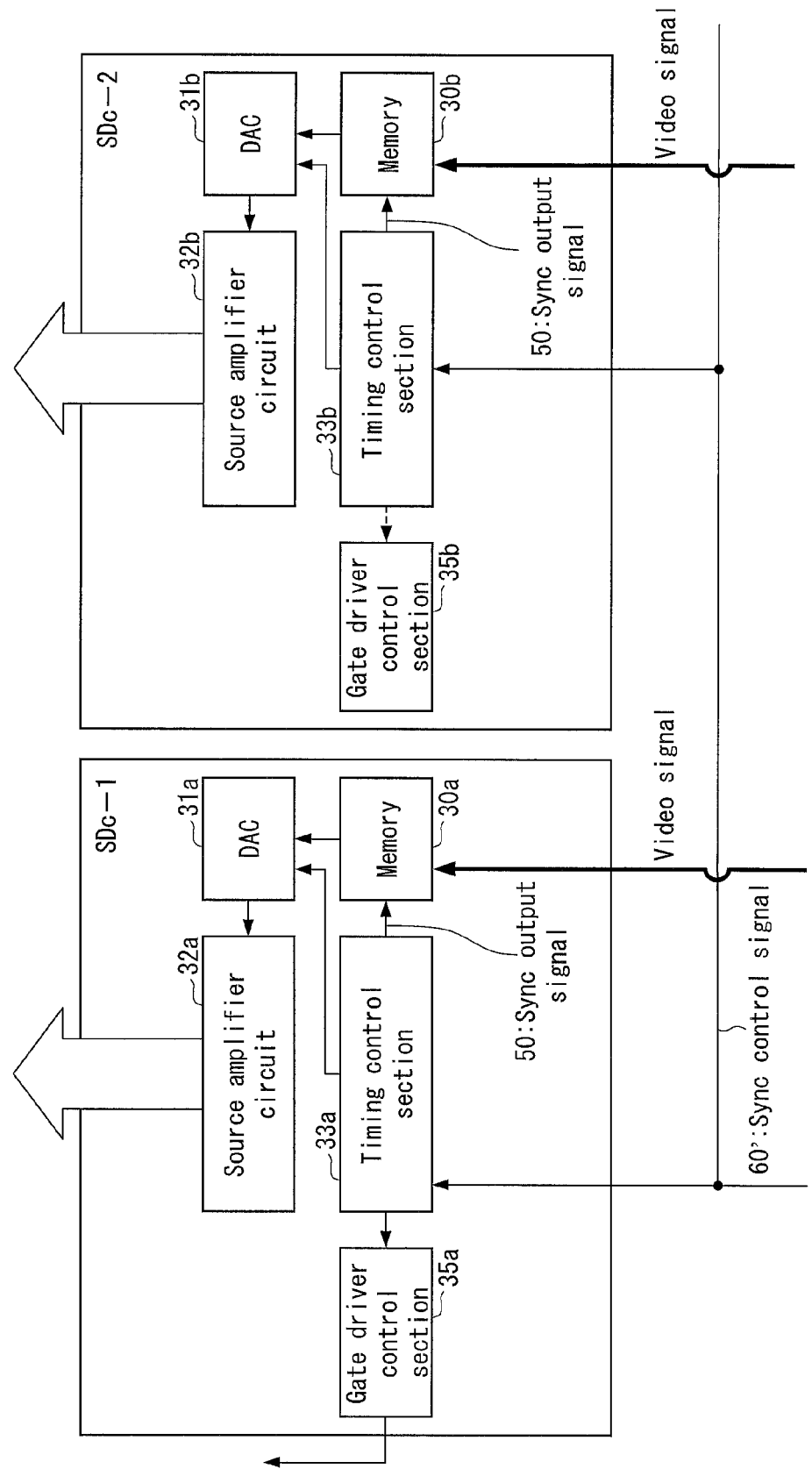
FIG. 15 is a view illustrating a configuration of the source driver in FIG. 14 and its peripherals.

With reference to FIGS. 14 and 15, the following description will discuss a display module in accordance with Fourth Embodiment of the present invention. For convenience, members having the same functions as those in the drawings referred to in First Embodiment are given the same reference signs and explanations thereof are omitted.

FIG. 14 is a view illustrating a configuration of a display module in accordance with the present embodiment, which configuration corresponds to the FIG. 1 configuration in accordance with First Embodiment. FIG. 15 is a view illustrating a configuration of a source driver and its peripherals in accordance with the present embodiment, which configuration corresponds to the FIG. 2 configuration in accordance with First Embodiment.

In First Embodiment, the first timing control section 33a of the first source driver SDa-1 (FIG. 2) generates, in accordance with the clock signal generated by the first clock generation section 34a, the sync control signal 60 (sync signal) for controlling an output of a video signal from the second memory section 30b of the second source driver SDa-2, and supplies the sync control signal 60 to the second (third to fifth) source driver SDa-2.

In contrast, in the present embodiment, there is provided a timing controller 2' (sync control means). Furthermore, a clock generation circuit 3 is provided separately from the timing controller 2' and the first source driver SDa-1 to fifth source driver SDa-5.

The timing controller 2' includes a clock generation circuit control section 22 and a circuit for generating a sync control signal 60' serving as a sync signal. The clock generation circuit control section generates a clock generation circuit control signal 90' and supplies the clock generation circuit control signal 90' to the clock generation circuit 3.

Upon reception of the clock generation control signal 90', the clock generation circuit 3 generates a clock signal and supplies the clock signal to the timing controller 2'.

The timing controller 2' generates the sync control signal 60' in accordance with the clock signal. Then, the timing controller 2' supplies the sync control signal 60' to all the source drivers (first to fifth source drivers).

For convenience, source drivers illustrated in FIG. 15 are a first source driver SDc-1 which controls a gate driver GD and a second source driver SDc-2 which does not control the gate driver GD. In FIG. 15, a third source driver SDc-3 to a fifth source driver SDc-5 illustrated in FIG. 14 are not illustrated. Since the third source driver SDc-3 to the fifth source driver SDc-5 each have substantially the same configuration as that of the second source driver SDc-2, their explanations are substituted with an explanation of the source driver SDc-2. In the present embodiment, the clock generation circuit 3 is provided separately, so that it is unnecessary to provide a clock generation section in each source driver.

Upon reception of the sync control signal 60' from the timing controller 2', the first timing control section 33a and the second timing control section 33b generate, in accordance with the sync control signal 60', a sync output signal 50 for causing the first memory section 30a and the second memory section 30b to supply video signals stored therein, and supply the sync output signal 50 to the first memory section 30a and the second memory section 30b, respectively.

(2) Effect of Fourth Embodiment

In the present embodiment, since the timing controller 2' generates the sync control signal 60', the source driver is not provided therein with a circuit having an unused function. Accordingly, it is possible to realize a simple and inexpensive total system.

[Fifth Embodiment]

(1) Configuration of Display Module in Accordance with Fifth Embodiment

Figure 16:
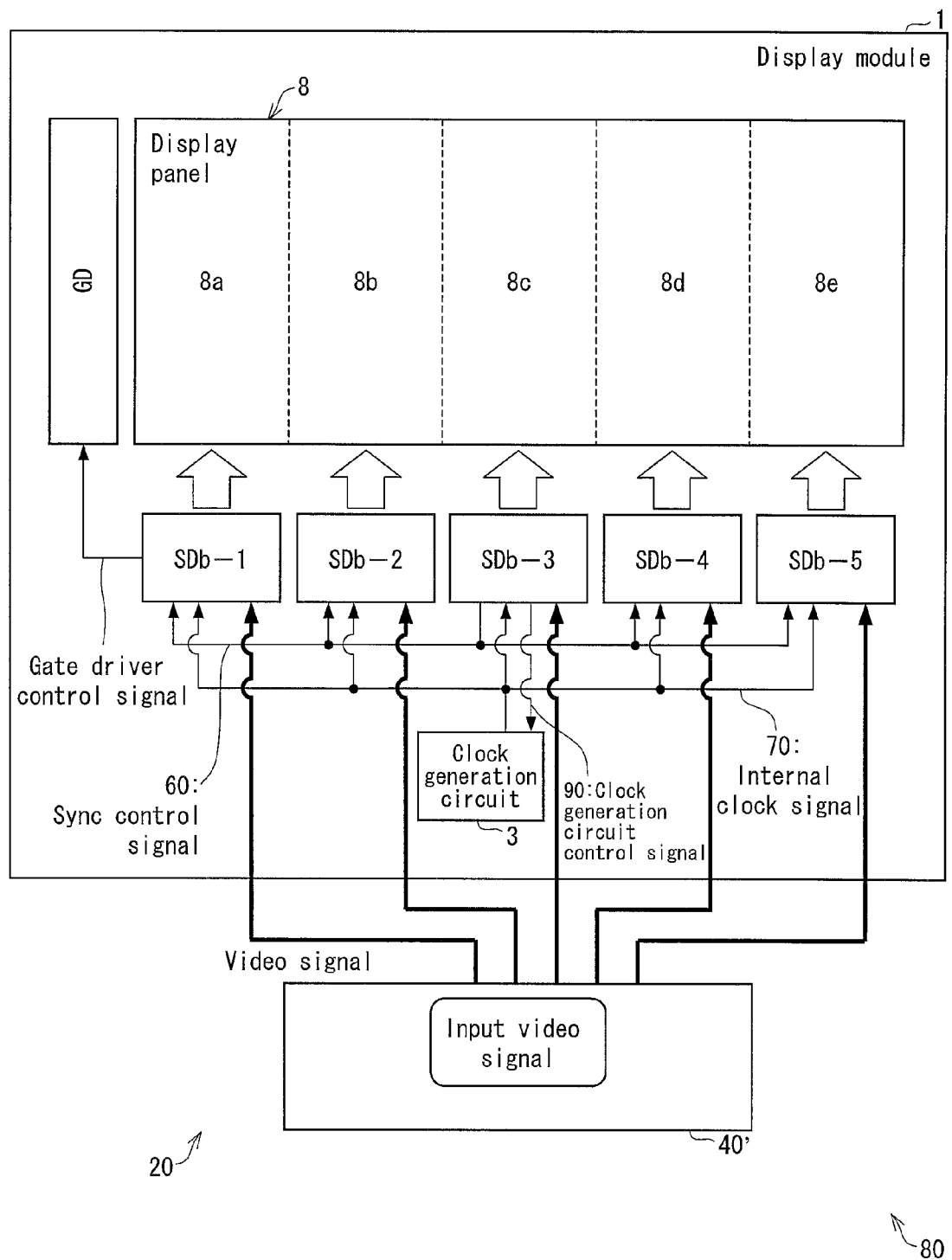
FIG. 16 is a view illustrating a display module in accordance with another (fifth) embodiment of the present invention.
Figure 17:
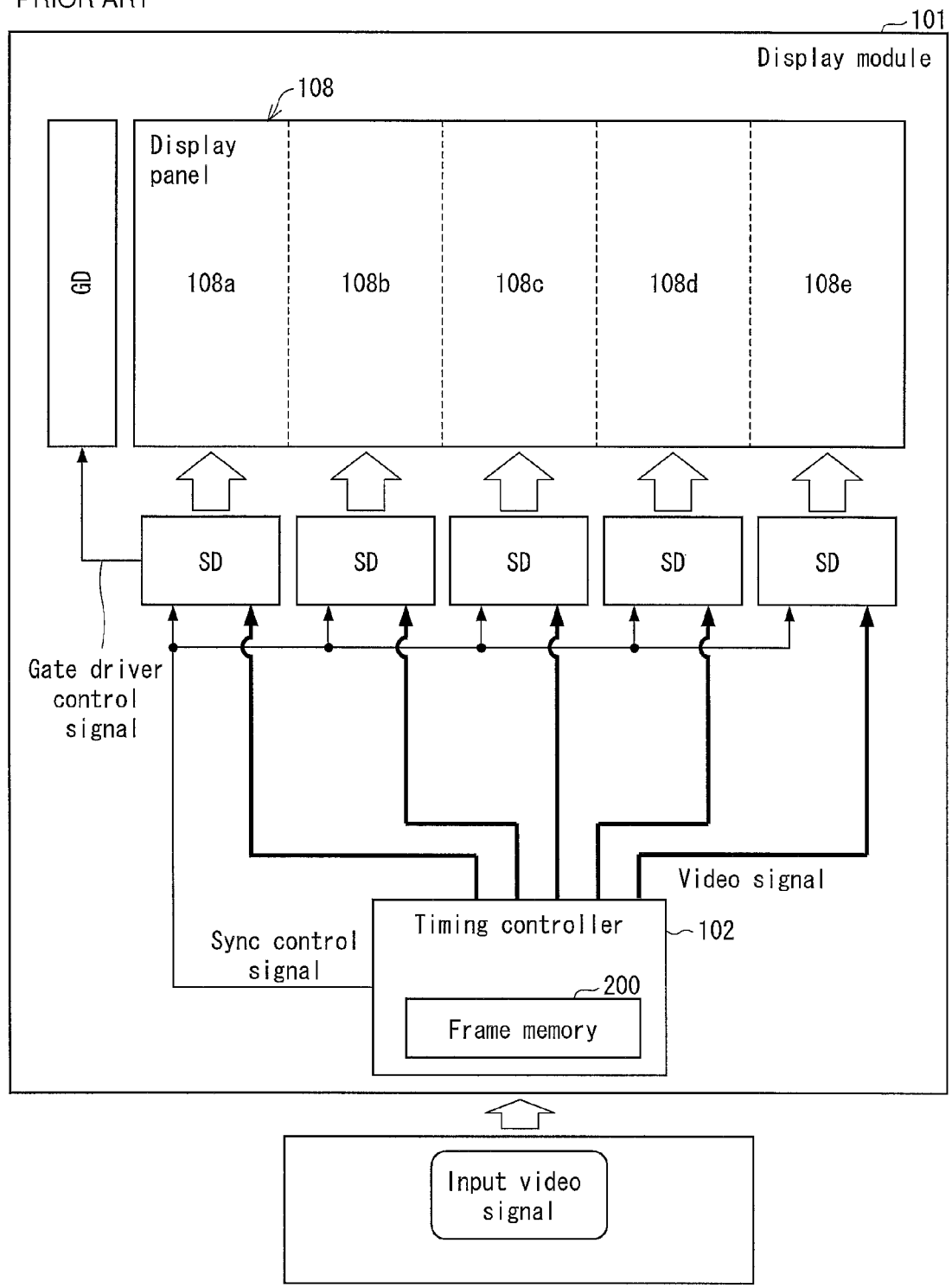
FIG. 17 is a view illustrating a conventional art.

With reference to FIG. 16, the following description will discuss a display module in accordance with Fifth Embodiment of the present invention. For convenience, members having the same functions as those in the drawings referred to in the fifth modification are given the same reference signs and explanations thereof are omitted.

FIG. 16 is a view illustrating a configuration of a display module in accordance with the present embodiment, which configuration corresponds to the FIG. 11 configuration in the fifth modification.

The present embodiment is different from the fifth modification in that in the present embodiment, no timing controller is provided and a video signal from a set section 40' is supplied directly to individual source drivers.

The set section 40' assigns, to individual source drivers, video signals for divided regions to which the source drivers belong, respectively. Therefore, intermediation of a timing controller is not required.

(2) Effect of Fifth Embodiment

In the present embodiment, the set section 40' assigns, to individual source drivers, video signals for divided regions, so that it is unnecessary to provide a timing controller. This allows for reduction in the number of members constituting a display module. Furthermore, this contributes to thinning of a display module.

(3) Seventh Modification

A modification is described here in which how signals are transferred from the set section 40' to individual source drivers is modified.

In the present embodiment, video signals are transferred from the set section 40' to all the source drivers SD at a constant amount per predetermined time.

However, the present invention is not limited to this. Alternatively, the set section 40' may be configured such that, in a case where it is not necessary to update a displayed image, the set section 40' decreases an amount of transferring a video signal to at least one source driver per predetermined time, or stops transferring a video signal to at least one source driver.

Specifically, the set section 40' may be configured such that, in a case where there is no change in a displayed image, the set section 40' decreases an amount of transferring a video signal to each source driver, or stops transferring a video signal to each source driver.

With the present modification, by controlling transferring of a video signal from the set section 40' to each source driver, it is possible to reduce power consumption required for transferring a video signal from the set section 40' to the source driver.

(4) Eighth Modification

The present modification performs controlling identical with that in the seventh modification except that the controlling herein is performed with respect to each divided region, i.e. each source driver. Specifically, the controlling in the present modification is similar to the controlling illustrated in FIG. 8 except that a video signal is supplied from the timing controller in FIG. 8 whereas a video signal is supplied from the set section 40' in the present modification.

As described above, by performing controlling with respect to each source driver, it is possible to reduce power consumption of a circuit in the set section 40' which circuit transfers a signal to a source driver.

The present invention is not limited to the description of the embodiments above, but may be altered by a skilled person within the scope of the claims. An embodiment based on a proper combination of technical means disclosed in different embodiments is encompassed in the technical scope of the present invention.

The present invention is not limited to the description of the embodiments above, but may be altered by a skilled person within the scope of the claims. A new embodiment will be obtained by combining technical means properly modified within the scope of the claims. The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

SUMMARY OF THE PRESENT INVENTION

As described above, a display module of the present invention includes: a plurality of source drivers respectively provided for a plurality of divided regions each being a part of a display region; a plurality of memory sections respectively provided for the plurality of source drivers, each of the plurality of memory sections being for storage of at least data of a video signal to be displayed on that one of the plurality of divided regions for which that one of the plurality of source drivers is provided, for which the memory section is provided; and sync control means for synchronizing the plurality of source drivers to synchronously output video signals that the plurality of source drivers output based on data respectively supplied from the plurality of memory sections of the plurality of source drivers, so that the synchronized video signals are supplied to corresponding ones of the plurality of divided regions.

With the arrangement, each of the plurality of source drivers includes a memory section for storage of at least data indicative of a video signal to be displayed on a divided region adjacent to said each of the plurality of source drivers. This allows keeping down an increase in the memory capacity of a timing controller or makes it unnecessary to increase the memory capacity a timing controller, thereby preventing cost-up of the timing controller which would be caused by the increase.

Furthermore, with the arrangement, in which the display module includes the sync control means, it is possible to synchronize video signals respectively supplied from the plurality of source drivers to the display region. Consequently, even when the display module includes a plurality of source drivers and/or includes no timing controller, the display module allows for satisfactory display without variations in display between the source drivers.

In addition to the above arrangement, it is preferable to arrange the display module of one aspect of the present invention such that the sync control means is provided separately from the plurality of source drivers, the sync control means generates a sync signal and supplies the sync signal to the plurality of source drivers, the sync control means includes a clock generation section for generating a clock signal serving as the sync signal, and a first source driver which is one of the plurality of source drivers includes a clock generation control section for controlling the clock generation section.

With the arrangement, the sync control means is provided separately from the source drivers, so that the sync control means can be formed with higher accuracy than sync control means provided inside a source driver.

An example of the sync control means is a sync control circuit. In a case where the sync control circuit is provided inside a source driver, there is limitation in accuracy in formation of the sync control circuit due to other constituents of the source driver. However, providing the sync control circuit separately from the source driver allows for formation of the sync control circuit without such limitation derived from the source driver, so that the sync control circuit can be formed with higher accuracy.

In addition to the above arrangement, it is preferable to arrange the display module of one aspect of the present invention such that the first source driver includes an internal sync signal generation section for generating an internal sync signal in accordance with the clock signal supplied from the clock generation section, and supplies the internal sync signal to the plurality of source drivers other than the first source driver.

With the arrangement, it is possible to synchronize, in accordance with the internal sync signal, between the plurality of source drivers, video signals indicated by data respectively supplied from the memory sections of the plurality of source drivers.

Instead of the above arrangement, the display module of one aspect of the present invention may be arranged so as to further include a timing controller, the sync control means including a clock generation section for generating a clock signal and a clock generation control section for controlling the clock generation section, the clock generation control section being provided in the timing controller, the clock generation section being provided separately from the plurality of source drivers and the timing controller, and the timing controller supplying a sync signal to the plurality of source drivers in accordance with the clock signal generated by the clock generation section.

In addition to the above arrangement, it is preferable to arrange the display module of the present invention so as to further include a timing controller, the sync control means being provided in the timing controller, the sync control means supplying a sync signal to the plurality of source drivers, and in a case where update of a displayed image is not required, the timing controller decreasing an amount of transferring a video signal to at least one of the plurality of source drivers per predetermined time, or stopping transferring a video signal to at least one of the plurality of source drivers.

With the arrangement, it is possible to reduce power consumption of a circuit for transferring a video signal to the source driver.

In addition to the above arrangement, it is preferable to arrange the display module of one aspect of the present invention such that the first source driver controls a gate driver.

With the arrangement, it is unnecessary to separately provide means for controlling a gate driver. This unnecessitates a space where such means is provided separately. Furthermore, since the first source driver has a function of synchronizing video signals between the plurality of source drivers, the first source driver is most appropriate for synchronization with the gate driver.

In addition to the above arrangement, it is preferable to arrange the display module of the present invention such that the sync control means is provided in the vicinity of the first source driver.

With the arrangement, in which the first source driver and the sync control means are provided in the vicinity of each other, it is possible to shorten the length of a wire as compared to a case where the first source driver and the sync control means are provided far from each other. This allows preventing delay in transferring a signal due to the length of a wire.

In addition to the above arrangement, it is preferable to arrange the display module of one aspect of the present invention such that the plurality of source drivers are provided along one side of the display region, the first source driver is provided at a middle position in a row of the plurality of source drivers, and the sync control means is provided in the vicinity of the first source driver.

With the arrangement, the first source driver is provided at a middle position in the row of the plurality of source drivers, and the first source driver and the sync control means are provided in the vicinity of each other. This allows shortening the length of a wire as compared to a case where the first source driver and the sync control means are provided far from each other, thereby preventing delay in transferring a signal due to the length of a wire. Furthermore, since a distance between the first source driver and other source drivers is relatively short, it is possible to prevent delay in transferring a signal due to the length of a wire.

In addition to the above arrangement, it is preferable to arrange the display module of one aspect of the present invention such that each of the plurality of source drivers includes a circuit for generating a multiplied wave, and the clock generation section supplies the clock signal to the circuit, and the circuit supplies a signal to the internal sync signal generation section.

With the arrangement, each of the plurality of source drivers includes a circuit for generating a multiplied wave. The circuit for generating a multiplied wave can change low frequency into high frequency. Accordingly, by providing each of the plurality of source drivers with the circuit, a signal supplied to the circuit may have low frequency. That is, a clock signal supplied to the circuit may have low frequency. A clock signal with low frequency can suppress an influence of variations in signals between the plurality of source drivers. Furthermore, a clock signal with low frequency allows for easy formation of a clock generation section, contributing to cost-down.

In addition to the above arrangement, it is preferable to arrange the display module of one aspect of the present invention such that the sync control means is provided in a first source driver which is one of the plurality of source drivers, the sync control means generates a sync signal and supplies the sync signal to the plurality of source drivers other than the first source driver, and in accordance with the sync signal, the plurality of source drivers synchronously output video signals that the source drivers output based on data respectively supplied from the plurality of memory sections of the plurality of source drivers, in order to supply the synchronized video signals to corresponding ones of the plurality of divided regions.

With the arrangement, the first source driver allows synchronizing video signals between the plurality of source drivers so that the synchronized video signals are supplied. This allows for a simplified configuration of peripherals of the source drivers, as compared to a case where sync control means is provided separately from the plurality of source drivers.

Furthermore, since a block for synchronization control is provided in a single source driver (first source driver), it is possible to prevent an increase in self-power consumption which would occur due to distribution of such a block between a plurality of source drivers (e.g. power consumption required by mere energization of a circuit to operate the circuit).

In addition to the above arrangement, it is preferable to arrange the display module of one aspect of the present invention such that the sync control means includes a clock generation section for generating a clock signal serving as the sync signal, and in accordance with the clock signal, the plurality of source drivers synchronously output video signals that the source drivers output based on data respectively supplied from the plurality of memory sections of the plurality of source drivers, in order to supply the synchronized video signals to corresponding ones of the plurality of divided regions.

With the arrangement, the sync control means included in the first source driver includes the clock generation section for generating a clock signal, and in accordance with the clock signal, the plurality of source drivers synchronously output video signals that the source drivers generate based on data respectively supplied from the plurality of memory sections of the plurality of source drivers, in order to supply the synchronized video signals to corresponding ones of the plurality of divided regions.

This unnecessitates separately providing a clock generation circuit, allowing for cost-down.

In addition to the above arrangement, it is preferable to arrange the display module of one aspect of the present invention such that the sync control means includes a control signal generation section for generating a control signal in accordance with the clock signal, and the sync control means supplies the clock signal and the control signal as the sync signal to the plurality of source drivers other than the first source driver.

With the arrangement, the sync control means includes the control signal generation section, and the clock signal and the control signal generated by the control signal generation section are supplied as an output sync signal for a video signal to the plurality of source drivers other than the first source driver.

This allows synchronization between the plurality of source drivers to be realized with use of a simple circuit configuration.

In addition to the above arrangement, it is preferable to arrange the display module of one aspect of the present invention such that the first source driver includes a clock generation section for generating a clock signal, the sync control means is provided in the first source driver, and includes a control signal generation section for generating a control signal in accordance with the clock signal generated by the clock generation section included in the first source driver, and the sync control means supplies the control signal to the plurality of source drivers other than the first source driver.

With the arrangement, the control signal is supplied to the plurality of source drivers other than the first source driver, and the plurality of source drivers other than the first source driver includes the clock generation section, so that outputs from all the source drivers can be synchronized in accordance with the control signal from the first source driver and clock signals generated in the plurality of source drivers other than the first source driver.

In order to solve the foregoing problems, an electronic device of the present invention includes: a display module with the above arrangement; and output means for supplying an input video signal supplied to the display module.

With the arrangement, the display module can receive the input video signal from the output means.

In addition to the above arrangement, it is preferable to arrange the electronic device of one aspect of the present invention such that the set means supplies the input video signal to each of the plurality of source drivers, and each of the plurality of source drivers receives part of the input video signal, the part of the input video signal being for one of the plurality of divided regions to which one said each of the plurality of source drivers corresponds.

With the arrangement, each of the plurality of source drivers receives the partial input video signal for one of the plurality of divided regions to which one said each of the plurality of source drivers corresponds. This allows reducing an amount of transferring a video signal, so that transfer interface can have lower frequency and the number of terminals required for transferring a video signal can be reduced.

In addition to the above arrangement, it is preferable to arrange the electronic device of one aspect of the present invention such that in a case where update of a displayed image is not required, the output means decreases an amount of transferring a video signal to at least one of the plurality of source drivers per predetermined time, or stops transferring a video signal to at least one of the plurality of source drivers.

With the arrangement, it is possible to reduce power consumption of a circuit for transferring a video signal to the source driver.

In order to solve the foregoing problems, a display device of the present invention includes: a display module with the above arrangement; and a light source section including a light source, the light source section being provided together with the display module.

With the arrangement, in the display module included in the display device, each of the plurality of source drivers includes a memory section for storage of at least data of a video signal to be displayed on a divided region adjacent to said each of the plurality of source drivers. This makes it unnecessary to increase the memory capacity of the timing controller, thereby suppressing cost-up of the timing controller which would be caused by the increase.

Furthermore, with the arrangement, in which the display module included in the display device includes the sync control means, it is possible to synchronize video signals respectively supplied from the plurality of source drivers to the display region. Consequently, even when the display module includes a plurality of source drivers and/or includes no timing controller, the display module allows for satisfactory display by receiving light from the light source section without variations in display between the source drivers.

In order to solve the foregoing problems, a method of the present invention for driving a display module is a method for driving a display module including: a plurality of source drivers respectively provided for a plurality of divided regions each being a part of a display region; and a plurality of memory sections respectively provided for the plurality of source drivers, each of the plurality of memory sections being for storage of at least data of a video signal to be displayed on that one of the plurality of divided regions for which that one of the plurality of source drivers is provided, for which the memory section is provided, the method including the step of synchronizing the plurality of source drivers to synchronously output video signals that the plurality of source drivers output based on data respectively supplied from the plurality of memory sections of the plurality of source drivers, so that the synchronized video signals are supplied to corresponding ones of the plurality of divided regions.

With the arrangement, each of the plurality of source drivers includes a memory section for storage of at least data of a video signal to be displayed on a divided region adjacent to said each of the plurality of source drivers. This allows keeping down an increase in the memory capacity of a timing controller or makes it unnecessary to increase the memory capacity a timing controller, thereby preventing cost-up of the timing controller which would be caused by the increase.

Furthermore, with the arrangement, the step of synchronizing allows synchronizing video signals respectively supplied from the plurality of source drivers to the display region. Consequently, even when the display module includes a plurality of source drivers and/or includes no timing controller, the display module allows for satisfactory display without variations in display between the source drivers.

Industrial Applicability

The present invention is applicable to a display device including a display panel having a plurality of display regions to which a plurality of source drivers correspond, respectively.

REFERENCE SIGNS LIST

1 Display module
2 Timing controller
2' Timing controller (sync control means)
3 Clock generation circuit (sync control means)
8 Display panel
8a First divided region
8b Second divided region
8c Third divided region
8d Fourth divided region
8e Fifth divided region
20 Display device
22 Clock generation circuit control section
30 Memory section
30a First memory section
30b Second memory section
31a First DAC
31b Second DAC
32a First source amplifier circuit
32b Second source amplifier circuit
33a, 33a' First timing control section (sync control means, internal sync signal generation section)
33b Second timing control section
34a First clock generation section (sync control means)
34b Second clock generation section
35a First gate driver control section
35b Second gate driver control section
36 Clock generation circuit control section (clock generation control section)
37 PLL circuit (circuit for generating multiplied wave)
40, 40' Set section (output means)
50 Sync output signal
60 Sync control signal
70 Internal clock signal
80 Electronic device
90, 90' Clock generation control signal
GD Gate driver
SDa-1 First source driver
SDa-2 Second source driver
SDa-3 Third source driver
SDa-4 Fourth source driver
SDa-5 Fifth source driver

The invention claimed is:

1. A display module, comprising:
a plurality of source drivers respectively provided for a plurality of divided regions each being a part of a display region;
a plurality of memory sections respectively provided for the plurality of source drivers, each of the plurality of memory sections being for storage of at least data of a video signal to be displayed on that one of the plurality of divided regions for which that one of the plurality of source drivers is provided, for which the memory section is provided; and
a sync controller configured to synchronize the plurality of source drivers to synchronously output video signals that the plurality of source drivers output based on data respectively supplied from the plurality of memory sections of the plurality of source drivers, so that the synchronized video signals are supplied to corresponding ones of the plurality of divided regions; wherein
the sync controller is provided separately from the plurality of source drivers,
the sync controller generates a sync signal and supplies the sync signal to the plurality of source drivers,
the sync controller includes a clock signal generator configured to generate a clock signal serving as the sync signal, and
a first source driver which is one of the plurality of source drivers includes a clock generation controller configured to control the clock signal generator.

2. The display module as set forth in claim 1, wherein the first source driver includes an internal sync signal generator configured to generate an internal sync signal in accordance with the clock signal supplied from the clock signal generator, and supplies the internal sync signal to the plurality of source drivers other than the first source driver.

3. The display module as set forth in claim 2, wherein each of the plurality of source drivers includes a circuit configured to generate a multiplied wave, and
the clock signal generator supplies the clock signal to the circuit, and the circuit supplies a signal to the internal sync signal generation section.

4. The display module as set forth in claim 1, further comprising a timing controller,
the sync controller being provided in the timing controller, the sync controller being configured to supply a sync signal to the plurality of source drivers, and
in a case where update of a displayed image is not required, the timing controller decreasing an amount of transferring a video signal to at least one of the plurality of source drivers per predetermined time, or stopping transferring a video signal to at least one of the plurality of source drivers.

5. The display module as set forth in claim 1, wherein the first source driver controls a gate driver.

6. The display module as set forth in claim 1, wherein the sync controller is provided in the vicinity of the first source driver.

7. The display module as set forth in claim 6, wherein
the plurality of source drivers are provided along one side of the display region,
the first source driver is provided at a middle position in a row of the plurality of source drivers, and
the sync controller is provided in the vicinity of the first source driver.

8. A display module, comprising:
a plurality of source drivers respectively provided for a plurality of divided regions each being a part of a display region;
a plurality of memory sections respectively provided for the plurality of source drivers, each of the plurality of memory sections being for storage of at least data of a video signal to be displayed on that one of the plurality of divided regions for which that one of the plurality of source drivers is provided, for which the memory section is provided; and
a sync controller configured to synchronize the plurality of source drivers to synchronously output video signals that the plurality of source drivers output based on data respectively supplied from the plurality of memory sections of the plurality of source drivers, so that the synchronize video signals are supplied to corresponding ones of the plurality of divided regions; and
a timing controller, wherein
the sync controller includes a clock signal generator configured to generate a clock signal and a clock signal generator controller configured to control the clock signal generator,
the clock signal generator controller being provided in the timing controller,
the clock signal generator being provided separately from the plurality of source drivers and the timing controller, and
the timing controller supplying a sync signal to the plurality of source drivers in accordance with the clock signal generated by the clock signal generator.

9. A display module, comprising:
a plurality of source drivers respectively provided for a plurality of divided regions each being a part of a display region;
a plurality of memory sections respectively provided for the plurality of source drivers, each of the plurality of memory sections being for storage of at least data of a video signal to be displayed on that one of the plurality of divided regions for which that one of the plurality of source drivers is provided, for which the memory section is provided; and
a sync controller configured to synchronize the plurality of source drivers to synchronously output video signals that the plurality of source drivers output based on data respectively supplied from the plurality of memory sections of the plurality of source drivers, so that the synchronized video signals are supplied to corresponding ones of the plurality of divided regions, wherein
the sync controller is provided in a first source driver which is one of the plurality of source drivers,
the sync controller generates a sync signal and supplies the sync signal to the plurality of source drivers other than the first source driver, and
in accordance with the sync signal, the plurality of source drivers synchronously output video signals that the source drivers output based on data respectively supplied from the plurality of memory sections of the plurality of source drivers, in order to supply the synchronized video signals to corresponding ones of the plurality of divided regions.

10. The display module as set forth in claim 9, wherein
the sync controller includes a clock signal generator configured to generate a clock signal serving as the sync signal, and
in accordance with the clock signal, the plurality of source drivers synchronously output video signals that the source drivers output based on data respectively supplied from the plurality of memory sections of the plurality of source drivers, in order to supply the synchronized video signals to corresponding ones of the plurality of divided regions.

11. The display module as set forth in claim 10, wherein
the sync controller includes a control signal generator configured to generate a control signal in accordance with the clock signal, and
the sync controller supplies the clock signal and the control signal as the sync signal to the plurality of source drivers other than the first source driver.

12. The display module as set forth in claim 9, wherein
the first source driver includes a clock signal generator configured to generate a clock signal,
the sync controller is provided in the first source driver, and includes a control signal generator configured to generate a control signal in accordance with the clock signal generated by the clock signal generator included in the first source driver, and
the sync controller supplies the control signal to the plurality of source drivers other than the first source driver.

* * * * *